(12) United States Patent
Ikesue

(10) Patent No.: US 12,522,541 B2
(45) Date of Patent: Jan. 13, 2026

(54) TB-CONTAINING RARE EARTH-ALUMINUM GARNET CERAMIC, AND METHOD FOR MANUFACTURING SAME

(71) Applicants: WORLD LAB. CO., LTD., Nagoya (JP); SUZHOU SMART ADVANCED COATING TECHNOLOGIES CO., LTD., Suzhou (CN)

(72) Inventor: Akio Ikesue, Nagoya (JP)

(73) Assignees: WORLD LAB. CO., LTD., Nagoya (JP); SUZHOU SMART ADVANCED COATING TECHNOLOGIES CO., LTD., Suzhou (CN); CERAMX TECHNOLOGY (SUZHOU) CO., LTD, Suzhou (CN)

(*) Notice: Subject to any disclaimer, the term of this patent is extended or adjusted under 35 U.S.C. 154(b) by 457 days.

(21) Appl. No.: 18/032,653

(22) PCT Filed: Oct. 19, 2021

(86) PCT No.: PCT/JP2021/038599
§ 371 (c)(1),
(2) Date: Apr. 19, 2023

(87) PCT Pub. No.: WO2022/085679
PCT Pub. Date: Apr. 28, 2022

(65) Prior Publication Data
US 2025/0091955 A1 Mar. 20, 2025

(30) Foreign Application Priority Data
Oct. 20, 2020 (JP) .............................. JP2020-175869

(51) Int. Cl.
*C04B 35/50* (2006.01)
*C04B 35/44* (2006.01)
(Continued)

(52) U.S. Cl.
CPC .......... *C04B 35/44* (2013.01); *C04B 35/6264* (2013.01); *C04B 35/6455* (2013.01);
(Continued)

(58) Field of Classification Search
CPC ................ C04B 35/50; C04B 35/6455; C04B 2235/3206; C04B 2235/3208;
(Continued)

(56) References Cited

U.S. PATENT DOCUMENTS

| 10,494,307 | B2 | 12/2019 | Yanagitani et al. |
| 2019/0366584 | A1 | 12/2019 | Matsumoto et al. |
| 2022/0146866 | A1* | 5/2022 | Yahagi .................... C04B 35/50 |

FOREIGN PATENT DOCUMENTS

| EP | 3872558 A1 | 9/2021 |
| JP | 2008-158314 A | 7/2008 |

(Continued)

OTHER PUBLICATIONS

Chong Chen, Xuezhuan Yi, Shuai Zhang, Yue Feng, Yanru Tang, Hui Lin, Shengming Zhou, Vacuum sintering of Tb3Al5O12 transparent ceramics with combined TEOS+MgO sintering aids, Ceramics International 41 (2015) 12823-12827 (Year: 2015).*

(Continued)

*Primary Examiner* — Bijan Ahvazi
(74) *Attorney, Agent, or Firm* — Troutman Pepper Locke LLP

(57) ABSTRACT

To provide a Tb-containing rare earth-aluminum garnet ceramic which has a Verdet constant similar to that of a TGG single crystal used in an isolator, has an insertion loss and extinction ratio equal to or greater than those of a TGG single crystal, generates less heat when a high-power laser is applied thereto, and is unlikely to cause a thermal lens effect or thermal birefringence. The present invention relates to: a Tb-containing rare earth-aluminum garnet ceramic (Continued)

including a garnet polycrystal represented by the compositional formula $(Tb_xRe_{1-x})_3(Al_ySc_{1-y})_5O_{12}$ wherein Re is at least one element selected from a group consisting of Y and Lu, x=1.0-0.5, and y=1.0-0.6, and including Si and at least one element selected from a group consisting of Ca and Mg; a method for producing same; and an isolator device obtained using the ceramic.

18 Claims, 5 Drawing Sheets

(51) Int. Cl.
| | |
|---|---|
| *C04B 35/626* | (2006.01) |
| *C04B 35/645* | (2006.01) |
| *G02F 1/01* | (2006.01) |
| *G02F 1/055* | (2006.01) |
| *G02F 1/09* | (2006.01) |
| *G02B 27/28* | (2006.01) |

(52) U.S. Cl.
CPC ............... *C04B 2235/3206* (2013.01); *C04B 2235/3208* (2013.01); *C04B 2235/3222* (2013.01); *C04B 2235/3224* (2013.01); *C04B 2235/3418* (2013.01); *C04B 2235/5436* (2013.01); *C04B 2235/604* (2013.01); *C04B 2235/656* (2013.01); *C04B 2235/662* (2013.01); *C04B 2235/764* (2013.01); *C04B 2235/786* (2013.01); *C04B 2235/9646* (2013.01); *G02B 27/286* (2013.01)

(58) Field of Classification Search
CPC .... C04B 2235/3418; C04B 2235/5436; C04B 2235/9646; G02F 1/0136; G02F 1/055; G02F 1/093; H01F 7/0273
See application file for complete search history.

(56) References Cited

FOREIGN PATENT DOCUMENTS

| | | |
|---|---|---|
| JP | 2011-213552 A | 10/2011 |
| JP | 2019-199387 A | 11/2019 |
| JP | 2019-207340 A | 12/2019 |
| WO | 2017/33618 A1 | 3/2017 |
| WO | 2020/085017 A1 | 4/2020 |

OTHER PUBLICATIONS

H. Yoshida et al, "Optical properties and Faraday effect of ceramic terbium gallium garnet for a room temperature Faraday rotator," Optics Express, vol. 19, No. 16, Jul. 22, 2011, pp. 15181-15187. (discussed in the spec).

M. Geho et al., "Growth of Terbium Aluminum Garnet (Tb3AI5O12:TAG) Single Crystals by the Hybrid Laser Floating Zone Method", Journal of Crystal Growth, 267, 2004, pp. 188-193. (discussed in the spec).

T. Fujii et al., "Crystal Growth and Optical Properties of Tb3AI5O12 with Faraday Effect", New Glass, vol. 18, No. 4, 2003, pp. 32-36. (discussed in the spec).

Hui Lin, S. Zhou et al., "Synthesis of Tb3AI5O12 (TAG) Transparent Ceramics for Potential Magneto-Optical Applications", Optical Materials, 33, 2011, pp. 1833-1836. (discussed in the spec).

Y.L. Aung et al., "Development of Optical Grade (TbxY1-x)3AI5O12 Ceramics as Faraday Rotator Material", J. American Ceramic Society, 2017, pp. 1-7. (discussed in the spec).

C. Chen et al., "Vacuum Sintering of Tb3AI5O12 Transparent Ceramics with combined TEOS + MgO Sintering Aids", Ceramics International, 41, 2015, pp. 12823-12827. (discussed in the spec).

\* cited by examiner

[Fig. 1(a-1)] 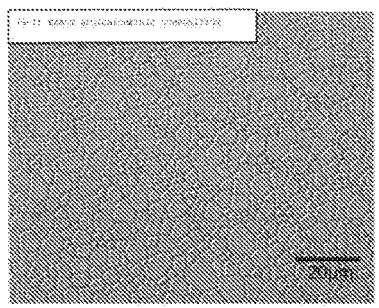
[Fig. 1(b-1)] 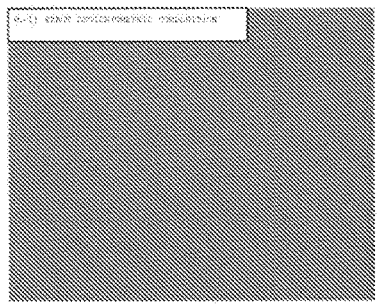
[Fig. 1(a-2)] 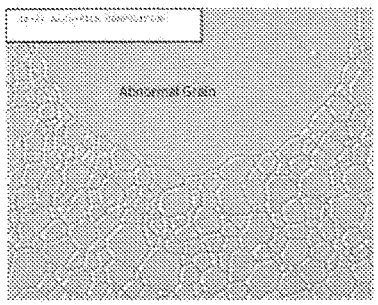
[Fig. 1(b-2)] 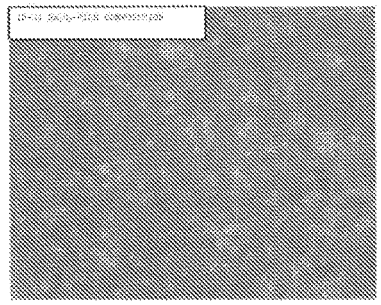
[Fig. 1(b-5)] 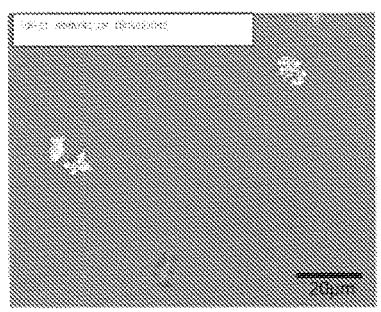
[Fig. 1(b-3)] 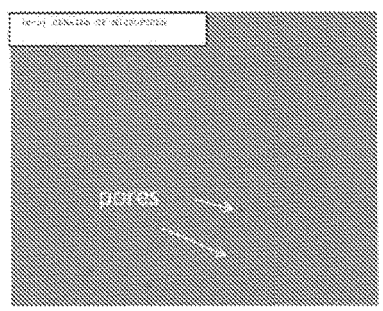
[Fig. 1(b-4)] 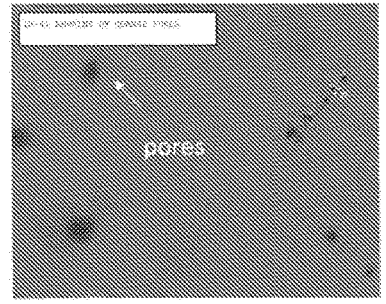

[Fig. 2 (a)]
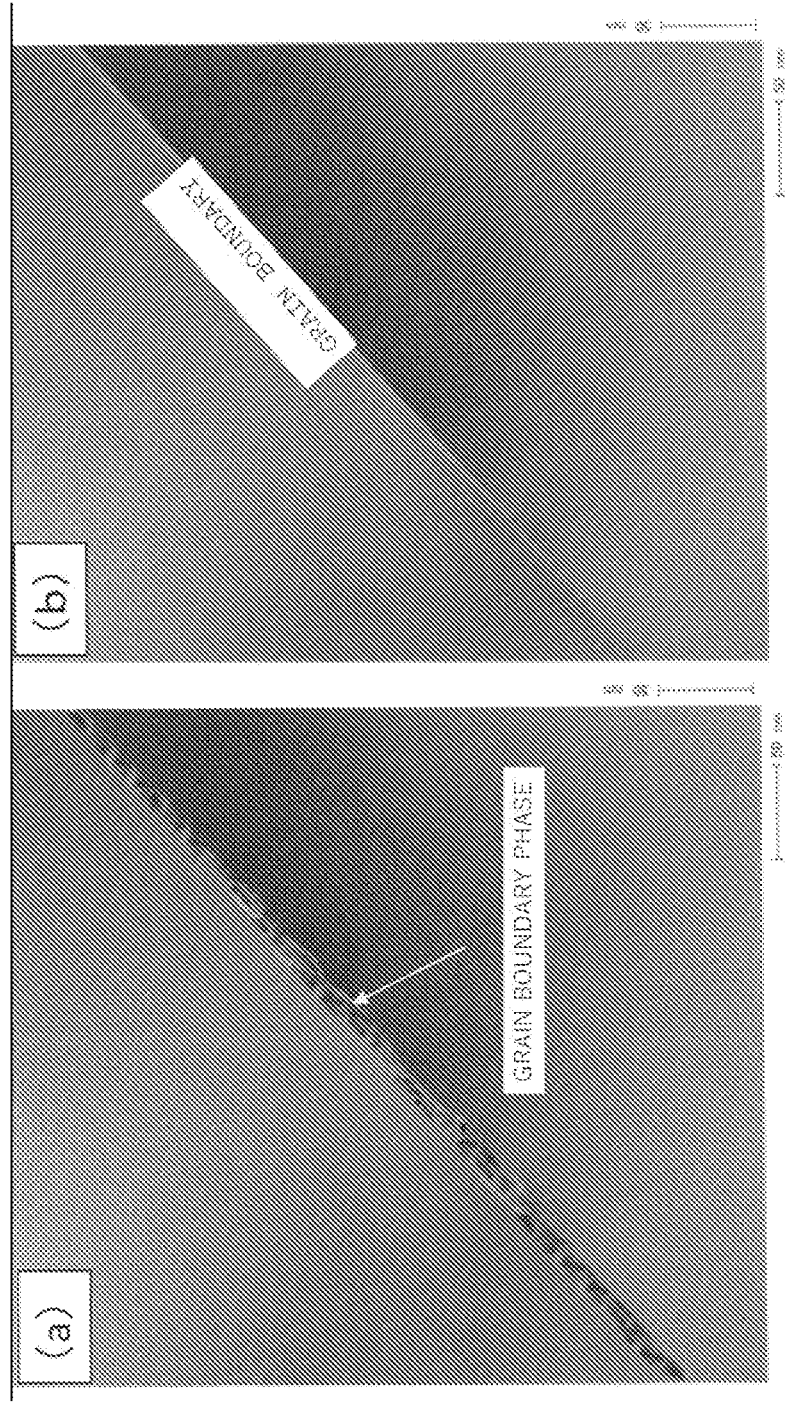
[Fig. 2 (b)]
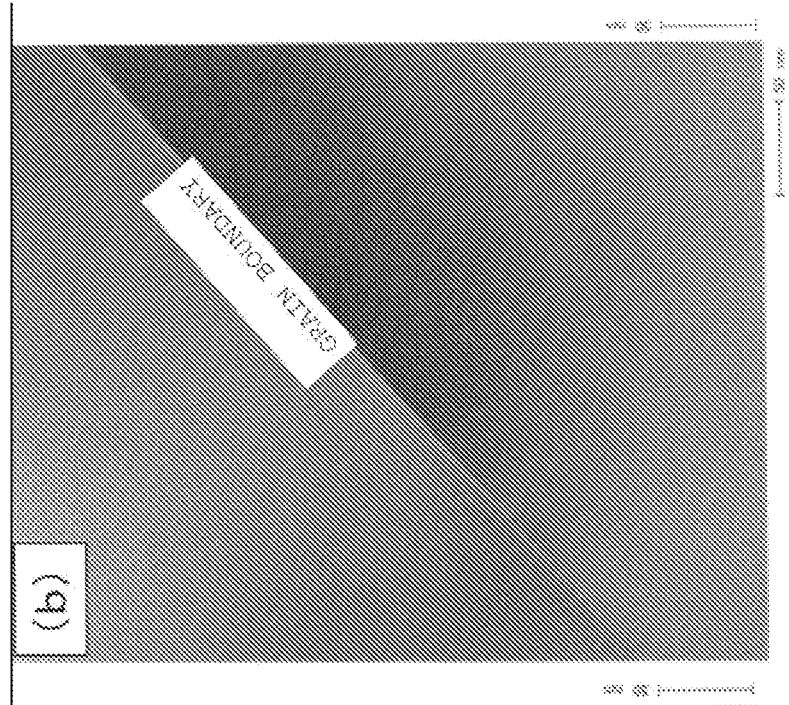

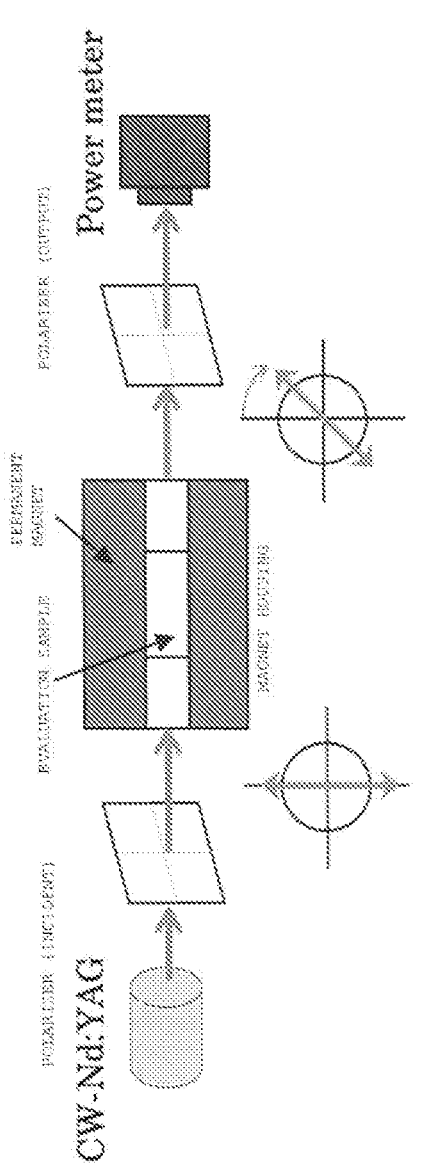
[Fig. 3]

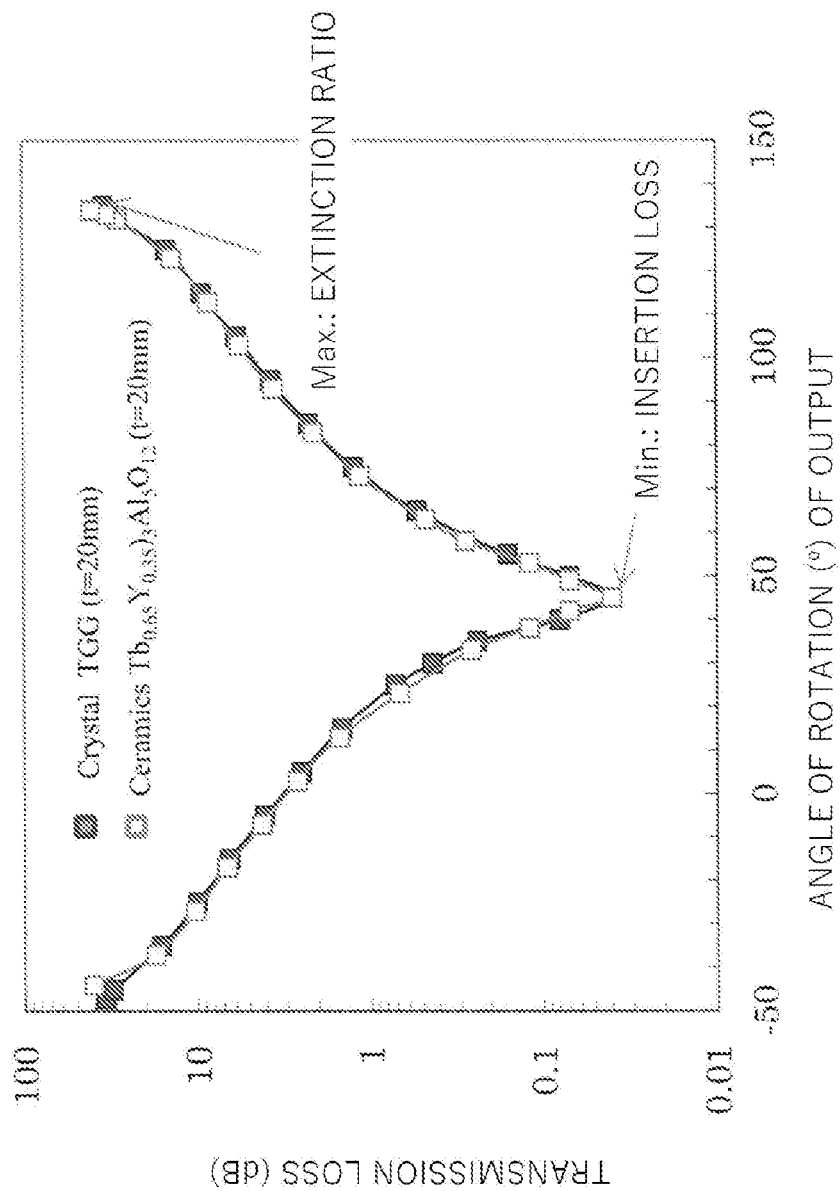
[Fig. 4]

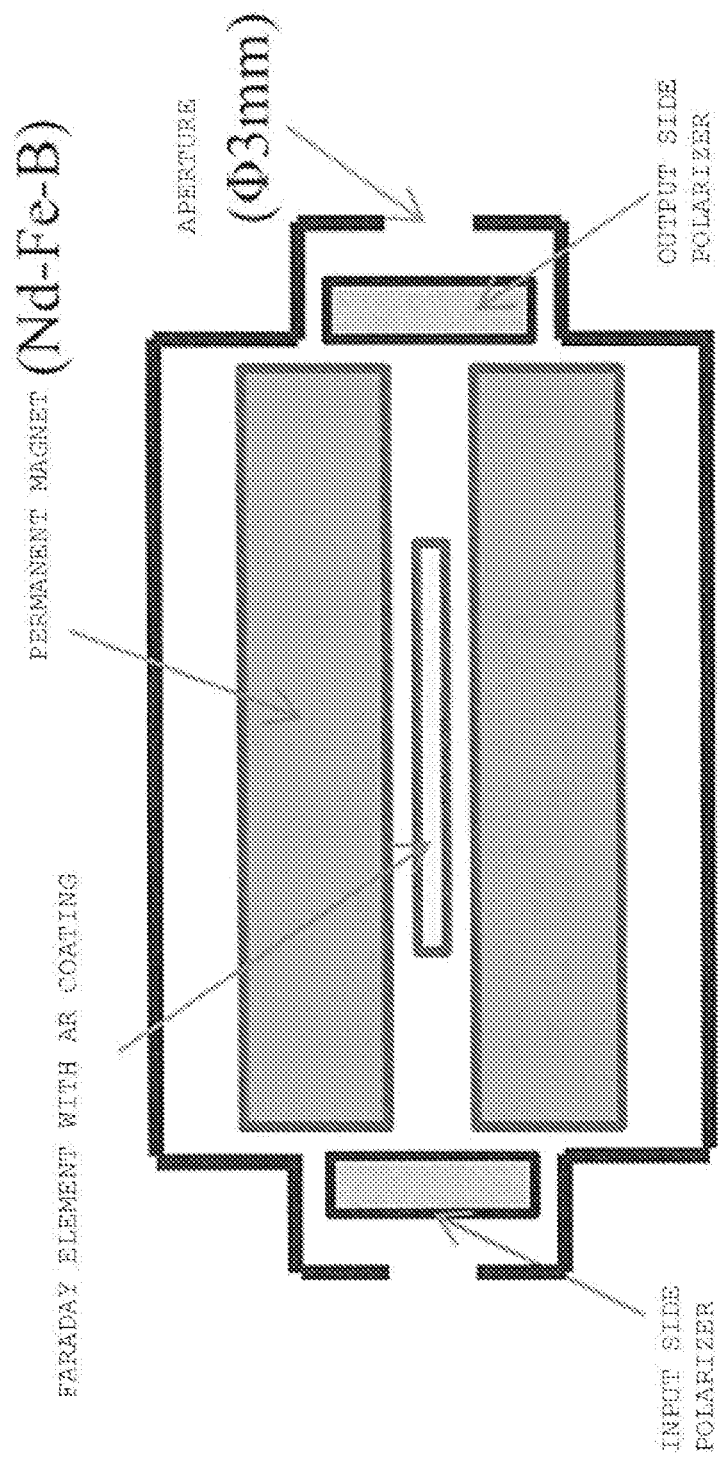
[Fig. 5]

TB-CONTAINING RARE EARTH-ALUMINUM GARNET CERAMIC, AND METHOD FOR MANUFACTURING SAME

TECHNICAL FIELD

The present invention relates to a novel Tb-containing rare earth-aluminum garnet ceramic, and to a method for producing the same.

BACKGROUND ART

Tb-containing garnet is most promising as a material that is able to polarize light in a 1 μm to visible wavelength region (Faraday rotation). Especially, TGG ($Tb_3Ga_5O_{12}$) can be produced as a relatively large material using the Czochralski method (CZ method), and can therefore be used as an element having the Faraday effect.

In particular, this material has a relatively high Verdet constant of 36 $radT^{-1}m^{-1}$ in the 1 μm wavelength region, has a low insertion loss of approximately 0.1 to 0.2 dB or less in a 1 T magnetic field at a medium length of 20 mm, and can be used as an isolator in a fiber laser for processing, and has therefore become a mainstream material in recent years.

In 1995, it was proved that performance similar to that of a single crystal can be achieved using a ceramic (a polycrystal) in which a grain boundary is present. TGG ceramics have also been reported as materials having relatively low optical loss (see NPL 1), but these ceramics have the problem of being inferior to single crystals in the short wavelength region equal to or lower than the visible light region, and therefore have the problem that laser damage threshold values are somewhat low.

TAG ($Tb_3Al_5O_{12}$) single crystals (see NPL 2 and 3) are promising as materials having performance exceeding that of TGG, but this material cannot be produced using the CZ method because of problems in terms of state diagrams, and only small crystals can be prepared due to a reliance on a floating zone method (FZ method). Moreover, in addition to problems relating to crystal size, it is also difficult to produce high quality materials in the FZ method, and such single crystals cannot be used as industrial materials.

In order to solve these problems, there have been proposals to synthesize transparent bodies by using ceramic technologies and using $SiO_2$ ($SiO_2$ obtained through decomposition of tetraethoxysilane (TEOS)) in isolation or a combination of TEOS+MgO as sintering aids (see NPL 4 and 6).

NPL 4 reports synthesizing a transparent TAG ceramic by adding TEOS, but the structure of the material is highly non-uniform, many voids or impurity phases are precipitated in the inner part of the material, and a sample having a thickness of 2.4 mm had an extremely low transmittance of 15 to 70%, and is therefore not suitable for use as a Faraday element.

In NPL 6, TEOS and MgO are used as sintering aids, but a sample (having a thickness of 1.5 mm) had a transmittance of approximately 70 to 80%, and because optical losses reported in this document were several hundred to several thousand times higher than those of a practical level, this material is unsuitable for optical applications.

However, a ceramic represented by $(Tb_xY_{1-x})_3Al_5O_{12}$ (x=0.5-1.0), which was the first to have optical characteristics comparable to basic characteristics of a TGG single crystal, was obtained by adding a small amount of TEOS ($SiO_2$) as a sintering aid (see NPL 5). The Verdet constant of such a material varies according to an increase in the Tb concentration in garnet, and the Verdet constant is 60 $radT^{-1}m^{-1}$ at a wavelength of 1064 nm if x=1.00 (that is, at a composition of $Tb_3Al_5O_{12}$), and therefore exhibits excellent characteristics. Materials having an even higher Verdet constant have the advantage of being able to lower the volume of a magnet that constitutes an isolator device.

PTL 1 and PTL 2 (hereinafter, these documents are collectively referred to as "PTL 1 etc.") disclose synthesizing Faraday elements by adding Si and Y or Si and Lu as sintering aids to ceramic materials represented by the formula $Re_3Al_5O_{12}$ (Re denotes an element having an atomic number of 65 to 71). In PTL 1 etc., as in NPL 5, optical characteristics required for isolators are achieved, but because Si is a sintering aid, it is not possible to guarantee the quality due to heat generation at the time of laser irradiation. Moreover, PTL 1 etc. disclose adding Si and Y or Si and Lu as sintering aids, but these are atoms that constitute Re sites in the $Re_3Al_5O_{12}$, and cannot be said to behave as sintering aids, and essentially only Si serves as a sintering aid.

In a Faraday element, it is important for the insertion loss (the optical loss when a magnetic field is applied to a material and when laser light that passes through a medium is polarized) to be low and for the extinction ratio to be high, but it is more important to be able to inhibit the generation of heat in practical terms. This is because the purpose of an isolator device in which a Faraday element is used is the function of shutting down return waves from a laser, but laser light that passes through a Faraday element has a certain amount of power. As the power of a laser increases, heat is generated in the inner part of a material, and because a thermal lens effect or birefringence occurs as a result of this heat, problems occur, such as the performance of the laser used for irradiation varying, the quality of the beam decreasing, and the focal length fluctuating, and performance as a laser for processing is lost.

Here, a thermal lens effect means that the temperature distribution in the inner part of a medium fluctuates as a result of heat generated for the reasons mentioned above, in other words, a refractive index distribution occurs, the quality of the beam decreases, and the focal length fluctuates. In addition, thermal birefringence means that birefringence occurs in a medium as a result of heat generated by a laser (this is fundamentally unlikely to occur in a cubic crystal material in which heat is not generated), and this causes the extinction ratio of a material to decrease and laser shutdown performance to decrease.

The optical loss of a TGG single crystal is approximately 0.2%/cm, but this is a value that includes not only light scattering, but also light absorption in a base material. If laser light is absorbed and heat is generated in the inner part of a base material, a fluctuation in refractive index dn/dT increases to $1.8×10^{-5}$ K as a result of the increase in temperature of the material, and a thermal lens effect readily occurs. Light sources for communication, in which optical fibers are used as transmission sources, have wavelengths of 1.5 μm, and because power levels are in the order of several tens of mW, the amount of heat generated in an isolator is extremely low and causes no problems in practical terms.

Conversely, fiber lasers using the visible to 1 μm wavelength band or ordinary solid lasers in which crystalline materials are used as sources of oscillation has high outputs that can reach the kilowatt level. Heat generated in isolators for such fiber lasers and solid lasers causes a decrease in the extinction ratio, which is a lifeline for isolators (that is, laser light shutdown performance is decreased significantly by thermal birefringence). Moreover, a non-uniform refractive index distribution caused by the inner part of a medium having a temperature distribution causes variations in the focusing spot of laser light. As a result, serious problems occur in terms of laser applicability.

For example, if a laser having a power of approximately 50 W or more is irradiated from a fiber laser for processing applications onto the TGG single crystal mentioned above, a significant thermal lens effect occurs and problems that causes processing difficulties occur. Ceramic materials described in PTL 1 etc. and NPL 5 have the advantage of a relatively high Verdet constant and have optical characteristics similar to those of TGG single crystals, but cannot fundamentally solve the problem of heat being generated.

The reason for this is not clear, but is thought to be due to the following mechanism. Added $Si(Si^{4+})$ substitutes $Al^{3+}$ at a 4-coordination site in the rare earth-aluminum garnet during a sintering process, but a cation defect occurs due to the difference in valency. It is thought that this cation defect causes heat to be generated through absorption of laser light, which causes a thermal birefringence or a thermal lens effect.

CITATION LIST

Patent Literature

[PTL 1] U.S. patent Ser. No. 10/494,307
[PTL 2] WO 2017/33618

Non Patent Literature

[NPL 1] H. Yoshida, K. Tsubakimoto et. al, "Optical Properties and Faraday, Optics Express, vol. 19, No. 16, 15181-87 (2011).
[NPL 2] M. Geho, T. Sekijima, T. Fujii, "Growth of Terbium Aluminum Garnet ($Tb_3Al_5O_{12}$:TAG) Single Crystals by the Hybrid Laser Floating Zone Method", J. Cryst. Growth, 267:188-793 (2004).
[NPL 3] T. Fujii, M. Geho, "Crystal Growth and Optical Properties of $Tb_3Al_5O_{12}$ with Faraday Effect", New Glass, vol. 18, No. 4, 32-36 (2003).
[NPL 4] H. Lin S. Zhou, H. Teng, "Synthesis of $Tb_3Al_5O_{12}$ (TAG) Transparent Ceramics for Potential Magneto-Optical Applications", Optical Materials, 33, 1833-36 (2011).
[NPL 5] Y. L. Aung, A. Ikesue, "Development of Optical Grade ($Tb_xY_{1-x})_3Al_5O_{12}$ Ceramics as Faraday Rotator Material", J. Am. Ceram. Soc., DOT: 10.1111/jace.14961(2017).
[NPL 6] C. Chen, X. Yi, S. Zhang, Y. Feng, Y. Tang, H. Lin, S. Zhou, "Vacuum Sintering of $Tb_3Al_5O_{12}$ Transparent Ceramics with combined TEOS+MgO Sintering Aids", Ceramics International, 41, 12823-27 (2015).

SUMMARY OF INVENTION

Technical Problem

Therefore, there have been fresh demands to reduce problems such as a thermal lens effect and birefringence in TGG ceramics and the like as a result of an increase in the power of fiber lasers in particular, but promising materials able to solve this type of problem are yet to be provided.

Therefore, a primary purpose of the present invention is to provide a Tb-containing rare earth-aluminum garnet ceramic which has a Verdet constant similar to that of a TGG single crystal used in an isolator; has an insertion loss and extinction ratio equal to or greater than those of a TGG single crystal, generates less heat when a high-power laser is applied thereto, and is unlikely to cause a thermal lens effect or thermal birefringence.

Solution to Problem

As a result of diligent research relating to problems inherent in the prior art, the inventor of the present invention has found that a material obtained using a specific production method has a unique structure and could therefore achieve the purpose mentioned, and thereby completed the present invention.

That is, the present invention relates to a Tb-containing rare earth-aluminum garnet ceramic described below, and to a method for producing same.

1. A Tb-containing rare earth-aluminum garnet ceramic including a garnet polycrystal represented by the compositional formula $(Tb_xRe_{1-x})_3(Al_ySc_{1-y})_5O_{12}$ (here, Re denotes at least one element selected from a group consisting of Y and Lu, x=1.0-0.5, and y=1.0-0.6), and including Si and at least one element selected from a group consisting of Ca and Mg.
2. The Tb-containing rare earth-aluminum garnet ceramic according to 1. above, wherein the content of Si, Ca and Mg (in weight ppm on the oxide basis) is 50 to 500 ppm by weight of $SiO_2$ and a total of 100 to 2000 ppm by weight of CaO and MgO.
3. The Tb-containing rare earth-aluminum garnet ceramic according to 1. above, wherein the weight ratio of Si, Ca and Mg (expressed in oxide equivalent of the metal) is such that $[(CaO+MgO)/SiO_2]$ is 1 or more.
4. The Tb-containing rare earth-aluminum garnet ceramic according to 1. above, wherein the average crystal grain diameter falls within a range from 1 to 30 μm.
5. The Tb-containing rare earth-aluminum garnet ceramic according to 1. above, which has a relative density of 99.999% or more.
6. The Tb-containing rare earth-aluminum garnet ceramic according to 1. above, wherein crystal phases other than the garnet polycrystal and amorphous phases are essentially not detected.
7. The Tb-containing rare earth-aluminum garnet ceramic according to 1. above, wherein at a thickness t by which light having a wavelength λ nm (here, 1200≥λ≥550) undergoes Faraday rotation of 45°, the insertion loss is 0.2 dB or less and an extinction ratio is 30 dB or more for the light.
8. A method for producing a Tb-containing rare earth-aluminum garnet ceramic, the method including:
(1) a step for wet mixing
(1-1) a mixed powder raw material which contains (a) a terbium oxide having an average primary particle diameter of 1 μm or less, (b) an aluminum oxide having an average primary particle diameter 1 μm or less, (c) at least one of a calcium compound having an average primary particle diameter of 1 μm or less and a magnesium compound having an average primary particle diameter of 1 μm or less, and (d) a silicon compound having an average primary particle diameter of 1 μm or less, and which has a stoichiometric garnet composition, or
(1-2) a mixed powder raw material which contains (a) an oxide which has an average primary particle diameter of 1 μm or less and is represented by the formula $(Tb_xRe_{1-x})_3(Al_ySc_{1-y})_5O_{12}$ (here, Re denotes at least one element selected from a group consisting of Y and Lu, x=1.0-0.5, and y=1.0-0.6, (b) at least one of a calcium compound having an average primary particle diameter of 1 µm or less and a magnesium compound having an average primary particle diameter of 1 µm or less, and (c) a silicon compound having an average primary particle diameter of 1 µm or less, and which has a stoichiometric garnet composition in an alcohol to obtain a mixture;

(2) a step for press molding this mixture to obtain a green compact;

(3) a step for subjecting this green compact to preliminary sintering at a temperature of 1450 to 1600° C. to obtain a preliminary sintered body having a relative density of 95 to 99%;

(4) a step for subjecting this preliminary sintered body to a HIP treatment at a temperature of 1500 to 1680° C. and a pressure of 49 to 196 MPa; and (5) a step for annealing the HIP-treated sintered body at a temperature of 1200 to 1500° C.

9. The production method according to 8. above, wherein $Tb_2O_3$ is used as the terbium oxide.

10. A Faraday element that contains the Tb-containing rare earth-aluminum garnet ceramic according to any one of 1. to 7. above.

11. An optical isolator device that includes the Faraday element according to 10. above.

Advantages of Invention

According to the present invention, it is possible to provide a Tb-containing rare earth-aluminum garnet ceramic which: has a Verdet constant similar to that of a TGG single crystal used in an isolator; has an insertion loss and extinction ratio equal to or greater than those of a TGG single crystal; generates less heat when a high-power laser is applied thereto; and is unlikely to cause a thermal lens effect or thermal birefringence.

According to the present invention, it is possible to provide a high performance Faraday element for a high output laser in the visible-infrared wavelength region. As a result, it is possible to provide an isolator having excellent protective performance in high output regions, which is not possible with TGG single crystals. Of course, it goes without saying that a Faraday element obtained using the ceramic of the present invention can also be used in existing lasers having relatively low power.

Because the material of the present invention, in which the concentration of Tb is 65% or more, has a Verdet constant that is at least equal to that of a TGG single crystal, it is possible to reduce the medium length or reduce the size of a magnet being used by up to about 40%, and it is therefore possible to produce an isolator device in which downsizing is possible, and a reduction in size can be a trigger for market expansion.

In addition, because the ceramic of the present invention does not undergo absorption in the manner of a TGG single crystal, the basic performance thereof is more suitable for use in high power applications than TGG. By adding $SiO_2$, as described in PTL 1 etc. and NPL 5, it is possible to attain a low insertion loss of approximately 0.1 dB and a low extinction ratio, but these were measured with a laser having a power of approximately 10 mW and a wavelength of 1 µm, which measures basic characteristics. If $SiO_2$ is added to a Tb-containing rare earth-aluminum garnet ceramic, a $Si^{4+}$ ion ultimately replaces an $Al^{3+}$ ion in the garnet structure, and a cation defect occurs. If a Tb-containing rare earth-aluminum garnet ceramic having a defect structure is irradiated with laser light, improvements are achieved over TGG, but heat is generated nonetheless, and a thermal lens effect or birefringence occurs. In the present invention, based on the finding that general characteristics of a Faraday element are insufficient if only $SiO_2$ is added, it was found that generation of heat could be effectively inhibited by adding a combination of other specific elements, and it was therefore possible to provide a material that is optimal for low-power to high-power lasers.

In this way, the transparent ceramic of the present invention has a low insertion loss that rivals or surpasses that of a conventional TGG single crystal obtained using the CZ method, and can achieve a high extinction ratio that was difficult to achieve with conventional techniques. In addition, the most important characteristics are that this can handle high power and can exhibit characteristics applicable to industry.

In addition, because the production method of the present invention can basically be carried out in accordance with the production methods for ceramics, except that specific conditions are specified, large media, which were previously thought to be difficult to produce using a FZ method, can also be produced, and also exhibits mass productivity, and is therefore suitable for production on an industrial scale.

BRIEF DESCRIPTION OF DRAWINGS

FIG. 1(a-1) shows a reflection microscope photograph of a ceramic of the present invention (which has a stoichiometric composition). FIG. 1(a-2) shows a reflection microscope photograph of a ceramic having an $Al_2O_3$-rich composition. FIG. 1(b-1) shows a transmission type polarization microscope photograph of a ceramic of the present invention. FIG. 1(b-2) shows a transmission type polarization microscope photograph of a ceramic having a $Re_2O_3$-rich composition. FIG. 1(b-3) shows a transmission type polarization microscope photograph of a ceramic having residual pores having an average diameter of 1 µm. FIG. 1(b-4) shows a transmission type polarization microscope photograph of a ceramic having residual pores having diameters of several µm to 10 µm. FIG. 1(b-5) shows a transmission type polarization microscope photograph of a ceramic in which inclusions remain as a result of non-uniformity at the time of production.

FIG. 2(a) shows a ceramic in which a grain boundary phase is present. FIG. 2(b) shows a ceramic having a clean grain boundary. (Both of these images are of ceramics having the composition $(Tb_{0.80}Y_{0.20})_3Al_5O_{12}$, taken with a transmission electron microscope at a magnification of 200,000 times).

FIG. 3 is a schematic view that shows a method for evaluating magneto-optical characteristics. A TGG single crystal having a length of 20 mm and a TAG ($Tb_3Al_5O_{12}$) ceramic having a length of 13 mm were used in these measurements.

FIG. 4 shows magneto-optical characteristics of a TGG single crystal and a $(Tb_{0.65}Y_{0.35})_3Al_5O_{12}$ ceramic. Values for transmission loss and extinction ratio are obtained by irradiating a material with laser light in a 1 T magnetic field and measuring transmission loss relative to angle of rotation of the output side polarizer.

FIG. 5 shows a schematic view of an isolator device equipped with a Faraday element. A permanent magnet (Nd-FeB) is arranged around the periphery of the Faraday element, a polarizer and an aperture are provided at both the laser input side and output side, and the device is made of a metal.

DESCRIPTION OF EMBODIMENTS

1. Tb-Containing Rare Earth-Aluminum Garnet Ceramic

The Tb-containing rare earth-aluminum garnet ceramic of the present invention (the ceramic of the present invention) is characterized by containing a garnet polycrystal represented by the compositional formula $(Tb_xRe_{1-x})_3(Al_ySc_{1-y})_5O_{12}$ (in the formula, Re denotes at least one element selected from a group consisting of Y and Lu, x=1.0-0.5, and y=1.0-0.6), and containing Si and at least one element selected from a group consisting of Ca and Mg.

As a basic composition, the ceramic of the present invention has a composition represented by the compositional formula $(Tb_xRe_{1-x})_3(Al_ySc_{1-y})_5O_{12}$ (Re is at least one element selected from a group consisting of Y and Lu, x=1.0-0.5, and y=1.0-0.6). A composition in which Re and/or Sc are substituted includes any of the combinations: a) $0.5 \leq x < 1$ and $0.6 \leq y < 1$; b) $0.5 \leq x < 1$ and $0.6 \leq y < 1$; and c) $0.5 \leq x < 1$ and $0.6 \leq y \leq 1$. Moreover, x can be specified such that, for example, x=0.99-0.5. In addition, y can be specified such that, for example, y=0.99-0.6.

Tb is an element that exhibits the greatest Faraday effect among lanthanide rare earth elements in the visible to infrared wavelength region. Therefore, because Dy, Ho, and the like, which exhibit a similar Faraday effect that is inferior to that of Tb, have many strong light absorption bands in the specified wavelength region, elements that exhibit the Faraday effect are limited to only Tb in the present invention.

In order to form a garnet structure, only Y or Lu is selected as another lanthanide element which has a lower ionic radius than Tb, can form a stable Tb-containing rare earth-aluminum garnet ceramic, and does not have absorption bands such as Dy or Ho. $Tb_3Al_5O_{12}$, in which the amount of Tb is 100% (x=1), is most preferred from the perspective of the Verdet constant of the material, but because the ionic radius of Tb is the largest at which a rare earth (Tb: 100%)·aluminum·garnet structure can be formed, the ceramic of the present invention may be somewhat unstable. This is the reason why Y, Lu and Sc, which have a smaller ionic radius than Tb and do not have absorption bands, are used in a part of the rare earth in the garnet structure. In addition, a composition in which Sc is added is more stable than TAG, and does not exhibit absorption in the visible to 1.5 μm wavelength region is given as an example of a reason for selecting Sc.

The ceramic of the present invention contains Si and at least one element selected from a group consisting of Ca and Mg (hereinafter these are collectively referred to as "additives"). By using a specific combination of such additives, it is possible to provide a ceramic element in which the amount of heat generated is extremely low even in high output operations.

Si is an essential element that is important for making the ceramic of the present invention transparent, but because simply adding this element facilitates grain growth as well as enabling transparency, residual pores as a source of scattering, also increase. In addition, as lattice defects are formed, absorption of irradiated laser energy occurs and heat is generated. In contrast, by using a combination of Si and at least one element selected from a group consisting of Ca and Mg in the present invention, it is possible to effectively inhibit or prevent problems mentioned above, such as residual pores and heat generation.

These additives achieve optical characteristics required for isolators in PTL 1 etc. and NPL 5, but because essentially only Si is used as an additive, heat generation cannot be inhibited. The present invention is fundamentally different in that it was found that it is important to use not only Si, which is effective for making the material transparent, but also Mg and/or Ca, which unify the structure of the material, further enhance optical characteristics and can inhibit generation of heat. In the present invention, the sintering aid is essentially substituted in the lattice of the Tb-containing rare earth-aluminum garnet ceramic, and does not serve as a light scattering source, and it is therefore possible to achieve an extremely low insertion loss. Accordingly, it is preferable not to contain a combination of, for example, Si and Y or Lu as an additive in the present invention.

The content of additives is not limited, and can be specified as appropriate according to, for example, the composition represented by the compositional formula above, desired physical properties, and so on, but it is generally preferable for the content of additives to be specified as follows in terms of oxides. Si: preferably 50 to 500 ppm by weight, and especially 100 to 500 ppm by weight, as a content of $SiO_2$. Ca and Mg: preferably 100 to 2000 ppm by weight, and especially 300 to 2000 ppm by weight, as a total content of CaO and MgO. By constituting in this way, it is possible to make the material transparent and reliably inhibit generation of heat, and therefore provide a ceramic element having higher performance.

In addition, the ratio of additives is not particularly limited, but it is generally preferable for the value of $(CaO+MgO)/SiO_2$ to be 1 or more, more preferably 1.5 or more, and most preferably 2.0 or more, in terms of weight ratio calculated as oxides. The upper limit for this ratio is not particularly limited as long as Si, which is essential for making the material transparent, is contained at a quantity of 50 ppm by weight or more in terms of $SiO_2$, but this upper limit can be, for example, approximately 6. By setting this ratio to fall within this range, the ceramic of the present invention can be more reliably used even in a high power range of, for example, 200 W or more.

The ceramic of the present invention is constituted from a garnet type polycrystal having the composition mentioned above, but the purity thereof is 99.8 wt % or more (and preferably 99.9 wt % or more) excluding additional components such as sintering aids.

It is particularly preferable for crystal phases other than the garnet polycrystal and amorphous phases (hereinafter collectively referred to as "second phases") to be essentially not detected in the ceramic of the present invention. Typical examples of second crystal phases include corundum phases (hexagonal crystals) and perovskite phases (tetragonal crystals) containing elements (cations and oxygen ions) that constitute the ceramic of the present invention. In addition to corundum phases, examples of phases that appear at crystal grain boundaries include crystal phases and amorphous phases constituted from oxides of elements (cations) that constitute the ceramic of the present invention. Here, the term "not detected" in the present invention means that second phases cannot be confirmed in both 1) analysis carried out using a transmission type polarizing microscope and 2) analysis carried out using a high resolution transmission electron microscope (HR-TEM).

Particularly important features of the present invention are that: the composition of the ceramic of the present invention is constituted from a composition that is almost identical to the stoichiometric composition; heterophases other than garnet crystal phases are essentially not detected in the inner part of the ceramic of the present invention; and birefringence is essentially not detected because of the garnet structure, that is, a cubic crystal structure.

The ceramic of the present invention is preferably a polycrystal having an average crystal grain diameter of 1 to 30 µm. If the average crystal grain diameter is too small, there are concerns that scattering will increase as the wavelength of a laser being used decreases. If the average crystal grain diameter is too large, pores, which are the greatest source of scattering, tend to remain in the inner part of grains.

The ceramic of the present invention generally has a porosity of 20 ppm or less, preferably 10 ppm or less, and particularly preferably 1 ppm % or less. That is, the ceramic of the present invention is fully dense (a relative density of 99.999% or more in particular), and can therefore exhibit excellent optical characteristics. The refractive index of residual pores is 1.00, but because the refractive index of the ceramic of the present invention is approximately 1.85, it is possible to reduce the number of scattering sources due to this high degree of compactness, and even contribute to a reduction in insertion loss in magneto-optical properties.

In addition, in a case where the ceramic of the present invention includes residual pores, the average pore diameter is not limited, but is preferably 1 µm or less, and more preferably 0.5 µm or less. If the average pore diameter is too high, this can be a cause of collapse when a high power laser, and especially a pulse laser having a high peak power, is inserted into a Faraday element. The average pore diameter can be determined using, for example, a transmission type microscope. The number of scattering sources (the number of residual pores) can be determined by measuring the number of scattering sources by laser irradiation and then determining the pore volume from results of the number of scattering sources and the average pore diameter.

The ceramic of the present invention is preferably such that at a thickness t whereby light having a wavelength λ nm (here, 1200≥λ≥550) undergoes Faraday rotation of 45°, the insertion loss is 0.2 dB or less for the light and the extinction ratio is 30 dB or more for the light. Because the ceramic of the present invention contains a relatively large amount of Tb, the transmission wavelength band of the Faraday element is 550 to 1400 nm. The ceramic of the present invention can be practically used within this range. However, because the Verdet constant decreases at longer wavelengths, the length of the element increases, and the wavelength is limited to that mentioned above due to a lack of special applications at wavelengths of 1200 to 1400 nm.

Here, the thickness of the ceramic of the present invention used as a measurement sample (the distance through which light passes) is defined as the thickness t at which the light undergoes Faraday rotation of 45°. For example, the medium length is approximately 20 mm when a sample having a Verdet constant of 36 radT$^{-1}$m$^{-1}$ at a wavelength of 1064 nm is placed in a 1 T magnetic field. (Faraday equation: θ=VHL (here, θ denotes Faraday rotation angle, V denotes Verdet constant, H denotes magnetic flux density, and L denotes length of Faraday element) The ceramic of the present invention, which has characteristics such as those described above, can exhibit performance that is at least equal to that of TGG single crystals, which were mainstream up to now, in terms of insertion loss and extinction ratio, which are fundamental characteristics of isolators.

This insertion loss is generally 0.2 dB or less, and is particularly preferably 0.1 dB or less. A low insertion loss is important from the perspective of being able to emit, with no loss, energy from laser light irradiated to the inner part of a material in a strong magnetic field. In order to measure fundamental performance, when the insertion loss of a TGG single crystal in a 1 T strong magnetic field is measured using a YAG laser (wavelength 1.064 µm), it is approximately 0.1 dB (0.05 dB in those parts having lowest loss) having a low output (10 mW). It is not difficult to attain an insertion loss of approximately 0.1 dB, which is equal to that of a single crystal, in the ceramic of the present invention, and it is possible to achieve an insertion loss of approximately 0.02 dB or less (which is difficult with a TGG single crystal) by optimizing synthesis of materials. Therefore, the lower limit of this insertion loss can be approximately 0.002 dB, but is not limited to this.

In addition, the extinction ratio, which is the ability to shut down return waves from a laser, is generally 30 dB or more, and is particularly preferably 40 dB or more. Because isolator devices can demonstrate an ability to shut down return waves from a laser as a protection system for laser oscillators, the extinction ratio is an important parameter for demonstrating a degree of protection performance. In general, the extinction ratio of TGG single crystals is approximately 30 dB, whereas the ceramic of the present invention can achieve an extinction ratio of 34 to 47 dB (measurement limit). Therefore, the upper limit of this extinction ratio can be, for example, approximately 47 dB, but is not limited to this.

Extinction ratio is an important value in a protection system. Extinction ratio tends to vary according to the incident power of a laser. For industrial applications, isolators used in the visible to infrared wavelength region are generally in the 1 µm wavelength band. If laser light is irradiated into a transparent substance, heat is generated in the inner part of the substance as the power increases. A certain temperature distribution occurs in the inner part of the material as a result of heat being generated, but this means that a refractive index distribution (a thermal lens effect) occurs in the inner part of the substance, and the Faraday element per se exhibits a lens effect, meaning that the focal length of laser light fluctuates. If the focal length varies, laser processing becomes difficult and functionality is completely lost. In addition, because birefringence (thermal birefringence) occurs in the inner part of the Faraday element as a result of heat being generated, the extinction ratio decreases as a result of the laser power. If the extinction ratio becomes extremely low, it is not possible to protect a device from return waves from a laser, and a laser oscillator may become damaged.

With regard to this, because TGG single crystal bodies exhibit slight light absorption (trace amounts of Tb$^{4+}$ remain), the thermal lens effect and thermal birefringence mentioned above occur to a greater extent as laser power increases, and these are not suitable for high power applications without cooling. If fiber laser light having a wavelength of 1 µm is focused to 300 µm and a TGG single crystal is inserted without cooling, the extinction ratio decreases only at a power of approximately 50 W, and it becomes difficult to protect the laser device. Conversely, the ceramic of the present invention is unlikely to cause a thermal lens effect or thermal birefringence because the amount of heat generated is extremely low, and it is therefore possible to maintain or exhibit an extinction ratio such as that mentioned above.

In the ceramic of the present invention, the Verdet constant, which indicates the strength of the Faraday effect, is not limited, but it is generally preferable for this Verdet constant to be approximately 80 to 25 radT$^{-1}$m$^{-1}$. This value can be regulated by the concentration of Tb in particular. For example, this value can be regulated within the range of approximately 60 to 29 radT$^{-1}$m$^{-1}$ in the range from a 100% Tb composition (that is, Tb$_3$Al$_5$O$_{12}$) to a composition ((Tb0.5Re0.5)$_3$Al$_5$O$_{12}$) at which the Tb concentration is the at lower limit. This is slightly different in (Tb$_x$Re$_{1-x}$)$_3$(Al$_y$Sc$_{1-y}$)$_5$O$_{12}$, in which some Al sites are substituted by Sc, but a similar trend is seen (that is, approximately 60 to 29 rad$^{T-1}$m$^{-1}$). If the Verdet constant is too low, it is necessary to increase the medium length in a 1 T magnetic field (or to use a long magnet housing that matches the medium length), and in a case where it is not desirable to increase the medium length, it is necessary to use a strong magnet calculated from the Verdet constant.

In addition, the ceramic of the present invention may be transparent and colored or transparent and colorless, but a transparent and colorless ceramic is particularly preferred. Because coloration characteristic of TGG single crystals (coloration caused by trace amounts of Tb$^{4+}$ remaining) is not observed in the ceramic of the present invention, it is understood that essentially no Tb$^{4+}$ remains in the inner part of the material. Therefore, the present invention can provide a colorless transparent ceramic.

2. Method for Producing Tb-Containing Rare Earth-Aluminum Garnet Ceramic

The ceramic of the present invention can be advantageously produced using the production method described below. That is, the ceramic of the present invention can be advantageously produced using a method for producing a Tb-containing rare earth-aluminum garnet ceramic, the method being characterized by including:

(1) a step for wet mixing (1-1) a mixed powder raw material which contains (a) a terbium oxide having an average primary particle diameter of 1 μm or less, (b) an aluminum oxide having an average primary particle diameter 1 μm or less, (c) at least one of a calcium compound having an average primary particle diameter of 1 μm or less and a magnesium compound having an average primary particle diameter of 1 μm or less, and (d) a silicon compound having an average primary particle diameter of 1 μm or less, and which has a stoichiometric garnet composition, or (1-2) a mixed powder raw material which contains (a) an oxide which has an average primary particle diameter of 1 μm or less and is represented by the formula (Tb$_x$Re$_{1-x}$)$_3$ (Al$_y$Sc$_{1-y}$)$_5$O$_{12}$ (here, Re denotes at least one element selected from a group consisting of Y and Lu, x=1.0-0.5, and y=1.0-0.6), (b) at least one element selected from a group consisting of a calcium compound having an average primary particle diameter of 1 μm or less and a magnesium compound having an average primary particle diameter of 1 μm or less, and (c) a silicon compound having an average primary particle diameter of 1 μm or less, and which has a stoichiometric garnet composition in an alcohol to obtain a mixture (a mixing step);

(2) a step for press molding this mixture to obtain a green compact (a molding step);

(3) a step for subjecting this green compact to preliminary sintering at a temperature of 1450 to 1600° C. to obtain a preliminary sintered body having a relative density of 95 to 99% (a preliminary sintering step);

(4) a step for subjecting this preliminary sintered body to a HIP treatment at a temperature of 1500 to 1680° C. and a pressure of 49 to 196 MPa (a HIP treatment step); and (5) a step for annealing the HIP-treated sintered body at a temperature of 1200 to 1500° C. (an annealing step).

Mixing Step

First, due to differences in raw materials used for constituting the basic composition of the ceramic of the present invention, it is possible to employ either (1-1) or (1-2) as a mixing step.

A mixed powder raw material which contains (a) a terbium oxide having an average primary particle diameter of 1 μm or less, (b) an aluminum oxide having an average primary particle diameter 1 μm or less, (c) at least one of a calcium compound having an average primary particle diameter of 1 μm or less and a magnesium compound having an average primary particle diameter of 1 μm or less, and (d) a silicon compound having an average primary particle diameter of 1 μm or less, and which has a stoichiometric garnet composition is used in step (1-1) above.

In step (1-2) above, mixing is carried out in the same way as in step (1-1) above, except that (a) an oxide which has an average primary particle diameter of 1 μm or less and which is represented by the formula (Tb$_x$Re$_{1-x}$)$_3$(Al$_y$Sc$_{1-y}$)$_5$O$_{12}$ (here, Re denotes at least one element selected from a group consisting of Y and Lu, x=1.0-0.5, and y=1.0-0.6) is used instead of (a) and (b) above. A composition in which Re and/or Sc are substituted includes any of the combinations: a) 0.5≤x<1 and 0.6≤y<1; b) 0.5≤x≤1 and 0.6≤y<1; and c) 0.5≤x<1 and 0.6≤y≤1. Moreover, x can be specified such that, for example, x=0.99-0.5. In addition, y can be specified such that, for example, y=0.99-0.6.

In step (1-1) above, oxides of elements that constitute the basic composition of the ceramic of the present invention can be advantageously used as starting materials for preparing the mixed powder raw material. Therefore, in addition to a terbium oxide (Tb$_4$O$_7$ or Tb$_2$O$_3$) and an aluminum oxide (α-Al$_2$O$_3$, γ-Al$_2$O$_3$, or the like), it is preferable to use an yttrium oxide (Y$_2$O$_3$), a lutetium oxide (Lu$_2$O$_3$), a scandium oxide (Sc$_2$O$_3$), or the like, in a case where some Tb sites or Al sites are to be substituted.

Valencies and so on of elements in these oxides are not limited, but it is particularly preferable to use Tb$_2$O$_3$ as a terbium oxide in the present invention. Tb$_4$O$_7$ is generally commercially available as a material that serves as a Tb source. This can be used to produce the ceramic of the present invention, which can be used in a Faraday element, but it is preferable to use Tb$_2$O$_3$ from the perspective of being able to produce the ceramic of the present invention more uniformly and stably.

In Tb$_4$O$_7$, which is generally commercially available, the theoretical Tb:O molar ratio is 4:7, but this ratio is not exact in practice. Therefore, because extremely slight compositional variations occur in rare earth parts (Tb sites) of the garnet structure when the ceramic of the present invention is produced, not only is it difficult for characteristics to be completely uniform, but there are concerns that partial contamination by TbO$_2$ will occur in the form of clusters. Because compositional adjustment is difficult in cases where Tb$_4$O$_7$ is used as a starting raw material for such reasons, it is possible to obtain an exact garnet composition by (1) checking the exact Tb:O ratio in advance and finely adjusting when weighing out raw materials, or (2) weighing out raw materials at a Tb:O ratio of 4.00:7:00, firing to obtain a sample, gaining feedback from fine structure observations of the sample (determining whether the sample is Al-rich or rare earth-rich), and then readjusting the composition of the raw materials to be mixed, but this has the drawback of the process being complicated. Conversely, when diligent research and investigations were carried out in order to achieve more perfect uniformity of materials, including compositional adjustment, in the present invention, it was confirmed that $Tb_2O_3$ was most preferred as a Tb source, as mentioned above.

At present, $Tb_2O_3$ is not generally produced by raw material manufacturers. Therefore, $Tb_2O_3$ can be used as a starting raw material by being synthesized. The method for producing $Tb_2O_3$ is not particularly limited, but a white $Tb_2O_3$ powder can be advantageously obtained using a method that includes a step for heat treating $Tb_4O_7$ (black-brown) at 1200 to 1300° C. in a reducing atmosphere such as hydrogen or CO gas. Because $Tb_2O_3$ is constituted purely from $Tb^{3+}$ and $O^{2-}$, it is possible to produce a more optically uniform sintered body when a ceramic having a garnet structure is produced. In a $Tb_2O_3$ powder obtained using the heat treatment described above, strong aggregation occurs as a result of powder particles being sintered to each other during the heat treatment, and it is therefore preferable to pulverize the $Tb_2O_3$ using a ball mill or the like.

These raw materials are generally used in the form of powders, but the average primary particle diameter in this case is generally 1 μm or less, and preferably 0.01 to 0.5 μm, as mentioned above.

On the other hand, in step (1-2) above, an oxide represented by the formula $(Tb_xRe_{1-x})_3(Al_ySc_{1-y})_5O_{12}$ (here, Re denotes at least one element selected from a group consisting of Y and Lu, x=1.0-0.5, and y=1.0-0.6) (hereinafter referred to as a "$Tb_3Al_5O_{12}$-based oxide") is used as a Tb source and an Al source. Otherwise, step (1-2) is the same as step (1-1). The $Tb_3Al_5O_{12}$-based oxide can be produced using a well-known production method, such as a coprecipitation method. The $b_3Al_5O_{12}$-based oxide preferably has an average primary particle diameter of 1 μm or less, and especially 0.01 to 0.5 μm.

(c) At least one of a calcium compound having an average primary particle diameter of 1 μm or less and a magnesium compound having an average primary particle diameter of 1 μm or less and (d) at least one of a silicon compound having an average primary particle diameter of 1 μm or less and a liquid silicon compound can be used as additives in steps (1-1) and (1-2) above.

Any of these compounds can be used as long as they do not substantially adversely affect the advantages of the present invention. Examples of calcium compounds include inorganic compounds such as $CaCO_3$, $Ca(OH)_2$, CaO and $CaF_2$, and organic compounds such as calcium alkoxides. One or two or more of these compounds can be used. Examples of magnesium compounds include inorganic compounds such as $MgCO_3$, MgO, $Mg(OH)_2$ and $MgF_2$, and organic compounds such as magnesium alkoxides. One or two or more of these compounds can be used. Examples of silicon compounds include inorganic compounds such as $SiO_2$ powders for fillers and colloidal silica, and organic compounds such as alkoxysilanes (for example tetraethoxysilane (TEOS) and tetrapropoxysilane (TPOS)). One or two or more of these compounds can be used.

Of these, compounds that ultimately form oxides as a result of decomposition through heating (especially hydroxides, carbonates, alkoxides, and the like) can be advantageously used as well as oxides in the present invention.

These inorganic compounds and organic compounds are preferably highly pure. For example, with regard to the purity of the inorganic compounds mentioned above, it is possible to use high purity raw materials for which the purity is generally 99.8 wt % or more, preferably 99.9 wt % (3N) or more, and more preferably 99.99 wt % (4N) or more. These raw materials per se can be commercially available products. With regard to the purity of the organic compounds mentioned above, it is possible to use reagents and the like having a purity of 99 wt % or more, and preferably 99.9 wt % or more.

These calcium compounds, magnesium compounds and silicon compounds can generally be used in the form of powders. The average primary particle diameter in this case is generally 1 μm or less, and preferably 0.01 to 0.5 μm, as mentioned above.

In the present invention, these components are weighed out so as to attain a stoichiometric composition that matches the garnet composition, and then subjected to wet mixing in an alcohol. Industrial alcohols containing ethanol as a primary component (for example, the product "Solmix"™ available from Japan Alcohol Trading Co., Ltd.) are economically effective as the alcohol, but the alcohol is not particularly limited, and alcohol-based solvents containing primary alcohols such as ethanol and isopropyl alcohol can be advantageously used.

In addition, in cases where a raw material powder having no hygroscopic properties or hydration properties (a garnet powder) is used or in cases of reactive sintering, the alcohol may contain water as long as a combination of raw materials hardly reacts with water. That is, 100% alcohols and alcohols diluted with water are encompassed by the "alcohol" in the present invention.

The usage quantity of the alcohol is not limited, and can generally be approximately 100 to 300 parts by weight relative to 100 parts by weight of the mixed powder raw material.

In addition, pulverizing media (balls) can be used if necessary during wet mixing. Constituting in this way effectively inhibits aggregation between particles during mixing and enables a mixture comprising ultrafine particles to be prepared.

By using alumina balls having a purity of, for example, 99.6 wt % or more or garnet balls or the like constituted from constituent elements of the present invention, such as YAG, as the pulverizing media, it is possible to minimize contamination by the balls. In addition, in cases where pulverizing media are used, it is preferable for the container to be made of a synthetic resin for the same reasons as those given above. Therefore, for the container and the pulverizing media, it is preferable to use a pulverizing/mixing device obtained using a pot constituted from a synthetic resin such as a fluororesin (for example, Teflon) or a variety of engineering plastics, or a garnet pot such as YAG ($Y_3Al_5O_{12}$) having a purity of 99.6% or more, which is constituted from constituent elements of the present invention. These devices can be well-known or commercially available devices.

In cases where pulverizing media are used, the usage quantity thereof can be, for example, 500 to 2000 parts by weight relative to 100 parts by weight of the mixed powder raw material, but is not limited to this range.

The mixing time can be sufficient for the composition of the mixed powder raw material to become uniform, and is generally approximately 10 to 40 hours, but is not limited to this.

After carrying out the mixing step, the obtained mixture should be recovered. The mixture can generally be obtained in the form of a slurry. The slurry can be housed in, for example, a heat-resistant plastic container, a Teflon™ container, or the like. The slurry can be supplied as-is to a molding step, but it is also possible to carry out a drying treatment, a granulation treatment, or the like, if necessary, and then supply the obtained product to a molding step.

For example a method that includes 1) a step for evaporating the solvent from the slurry at a temperature of 70 to 90° C. to obtain a dry powder and 2) a step for pulverizing the dry powder to obtain a powder that passes through a 100 mesh sieve can be used as a drying treatment.

For example, a method that includes a step for granulating and drying the slurry can be used as a granulation treatment. For example, well-known methods, such as stirring granulation, oscillating granulation and spray drying, can be used as methods for carrying out granulation and drying. The average particle diameter of a granulated product (granules) in this case is not particularly limited, but is preferably approximately 10 to 50 μm in general.

Molding Step

In the molding step, the mixture is formed into a green compact by press molding. Moreover, the term "the mixture" in the present invention encompasses not only the mixture per se obtained in the aforementioned step (in which the water content is not adjusted), but also a mixture in which the water content has been adjusted. Moreover, the amount of solid content (or the water content) in the mixture can be adjusted as appropriate by carrying out a drying treatment or the like such as that described above.

A press molding method is not particularly limited, and it is possible to use one of publicly known methods, such as uniaxial press molding or cold isostatic press molding (CIP molding), or a combination of two or more of these. For example, a green body can be obtained by carrying out uniaxial press molding as primary molding and then carrying out CIP molding as secondary molding.

The pressure used at the time of molding can be specified, as appropriate, according to the particle diameters of the raw material powders being used, the compositions of the raw material powders, and so on, but it is generally preferable to use a pressure so as to attain a density that is approximately 40 to 65% of the theoretical density of an obtained molded body.

For example, as isolator elements for laser emission using lasers, rods, and the like, the mixture are formed into round rods (having, for example, a diameter of 8 mm and an arbitrary length), and for slab laser emission applications, the mixture can be molded into slab shapes having a rectangular cross section. For isolators for exciting fiber lasers and solid lasers, the shape thereof must be controlled according to the required shape. In the case of CIP molding, the pressure can be set, as appropriate, within the range 98 to 198 MPa, but the pressure is not limited to this. In cases where molding is carried out in two stages, as mentioned above, uniaxial press molding may be carried out at a pressure of approximately 5 to 20 MPa using a mold, and CIP molding may then be carried out at a pressure of approximately 98 to 198 MPa.

The obtained green compact is then subjected to a preliminary sintering step. In a case where an organic binder is used in the molding step or a case in which pulverizing media (and especially media made of a synthetic resin) are used, it is preferable to remove organic components by firing the obtained green compact. In such cases, firing (organic substance removal) conditions are not limited, and firing can be carried out, for example, at approximately 600 to 1100° C. in an oxidizing atmosphere.

Preliminary Sintering Step

In the preliminary sintering step, this green compact is subjected to preliminary sintering at a temperature of 1450 to 1600° C. to obtain a preliminary sintered body having a relative density of 95 to 99%.

The preliminary sintering temperature can generally be 1450 to 1600° C., and preferably 1500 to 1600° C., but this temperature can be adjusted, as appropriate, according to the sintering characteristics of the raw materials being used. Therefore, this temperature can be set to, for example, 1500 to 1580° C. If this temperature is too low, the pressure cannot reach the inner part of a preliminary sintered body even if the preliminary sintered body having insufficient compaction (a sintered body having many open pores) is subjected to HIP, as a result, the compaction per se is insufficient and sufficient transparency cannot be obtained. If this temperature is too high, constituent particles are too large relative to the residual pore size, meaning that compaction and transparency are insufficient because residual pores cannot be efficiently removed, and in the worst case, the formation of abnormal grain growth (heterogeneous microstructures) leads to compaction, heterogeneity and transparency deteriorating. The preliminary sintering time can be set, as appropriate, according to the density and particle size of the preliminary sintered body, the size of the green compact, and so on.

In addition, the temperature increase rate at the time of preliminary sintering can be specified, as appropriate, according to the sintering properties, size, and so on, of the green compact, but it is particularly preferable for this temperature increase rate to be 200° C./hr or less within the temperature range of 1000° C. or higher. In this way, the amount of residual pores can be more effectively reduced.

The preliminary sintering atmosphere is preferably a hydrogen atmosphere, an oxygen atmosphere or a vacuum, but a vacuum is more preferred. The degree of vacuum is not limited, but is particularly preferably approximately $10^{-1}$ to $10^{-5}$ Pa.

A thus obtained preliminary sintered body is then subjected to a HIP treatment step. At this point, the preliminary sintered body preferably has a relative density of 95 to 99%, and especially 98 to 99.9%. Furthermore, the average crystal grain diameter of the preliminary sintered body is preferably 5 μm or less. Such characteristics can be more reliably achieved by carrying out the preliminary sintering under conditions such as those described above.

HIP Treatment Step

In the HIP treatment step, this preliminary sintered body is subjected to a HIP treatment at a temperature of 1500 to 1680° C. and a pressure of 49 to 196 MPa.

The temperature in the HIP treatment can generally be 1500 to 1680° C., but is particularly preferably 1550 to 1650° C. By specifying such a temperature range, it is possible to effectively reduce the amount and size of pores remaining in the obtained sintered body.

The pressure in the HIP treatment can generally be 49 to 196 MPa, and is particularly preferably 98 to 196 MPa.

The atmosphere in the HIP treatment is not particularly limited, and it is possible to use, for example, an oxygen-containing atmosphere, an inert gas atmosphere, or the like. A mixed $O_2$—Ar gas or mixed $O_2$—$N_2$ gas having an oxygen concentration of 20 vol % or less can be advantageously used as an oxygen-containing atmosphere. In the present invention, an inert gas atmosphere such as argon gas or nitrogen gas is particularly preferred.

The HIP treatment time can be altered, as appropriate, according to the HIP treatment temperature and so on, but can generally be 1 to 10 hours.

In the HIP treatment, the temperature increase rate and temperature decrease rate are not particularly limited, but it is generally possible for both of these to be approximately 300 to 600° C./hr.

Annealing Step

In the annealing step, this HIP-treated sintered body is annealed at a temperature of 1200 to 1500° C. By carrying out the annealing step, lattice defects, strain, and the like, which can be present in the inner part of the sintered body, can be more reliably eliminated.

The temperature in the annealing treatment can generally be 1200 to 1500° C., and is particularly preferably 1250 to 1400° C. The treatment atmosphere can be an oxygen-containing atmosphere and can be, for example, an atmosphere such as a mixed $O_2$—Ar gas or a mixed $O_2$—$N_2$ gas in addition to an air atmosphere. The pressure is not particularly limited, but the annealing step can generally be carried out at atmospheric pressure (normal pressure). The annealing treatment time can be altered, as appropriate, according to the size of the sintered body, the treatment temperature, and so on, but can generally be 3 to 10 hours.

The annealed sintered body can be used as an optical material such as an optical isolator either as-is or after being processed into a prescribed shape if necessary. The processing method is not particularly limited, and it is possible to use a well-known cutting method, polishing method, or the like.

3. Use of Ceramic of the Present Invention

The ceramic of the present invention can be used in a variety of optical materials. The ceramic of the present invention is particularly effective as a Faraday rotation element used in an optical isolator device. In a case where the ceramic of the present invention is used as an optical isolator, a configuration similar to one used in well-known isolator devices can be employed, except that the ceramic of the present invention is used as a Faraday rotation element.

FIG. 4 shows an example of a configuration of an optical isolator in which the ceramic of the present invention is used. A permanent magnet such as a Nd—Fe—B magnet and polarizers on the laser light input and output side are arranged around the periphery of a material. Unlike in an ordinary optical isolator, the ceramic of the present invention is used as a Faraday rotor. TGG single crystals are used in Faraday elements in ordinary isolators used in the visible to infrared wavelength region, but it is possible to use the polycrystal ceramic of the present invention instead of said TGG single crystals.

Embodiments of the Present Invention

In the present invention, oxides that essentially constitute a material (one or more rare earth oxides among $Tb_4O_7$, $Lu_2O_3$ and $Y_2O_3$, $Al_2O_3$ and $Sc_2O_3$) and additives were weighed out, wet mixed→dried→subjected to uniaxial molding→subjected to cold isostatic pressing→degreased→subjected to preliminary sintering→subjected to hot isostatic pressing so as to synthesize the material, the obtained transparent sintered body was annealed at a temperature of 1200 to 1500° C. in an oxygen-containing atmosphere so as to remove lattice defects, strain, and the like, in the inner part of the material, and the sintered body was then mechanically processed into a prescribed shape (a typical example is a rod having a diameter of 5 mm and a length of 20 mm). Next, input and output surfaces through which a laser beam passes (both surfaces have a diameter of 5 mm) were finished to a flatness $\lambda/10$ ($\lambda=633$ nm), a parallelism <10 sec and surface roughness Ra of approximately 0.2 nm, and an AR (anti-reflection) coating treatment for the wavelength band to be used was performed on the polished surfaces, thereby obtaining a Faraday (ceramic of the present invention) element.

FIGS. 1(*a*-1) to (*b*-5) show microscope photographs of $(Tb_{0.8}Y_{0.2})_3Al_5O_{12}$ transparent ceramics. FIG. 1(*a*-1) is a reflection microscope photograph of a sample having a composition which has no deviation from stoichiometric composition after being polished and thermally etched. FIG. 1(*a*-2) is a reflection microscope photograph of a ceramic having a composition that is 0.02% $Al_2O_3$-rich in comparison with the exact stoichiometric composition, and abnormal grains can be seen. FIG. 1(*b*-1) is a transmission type polarization microscope photograph of a sample having the exact stoichiometric composition after being polished, and it is understood that the sample has a uniform color (birefringence is essentially not detected) and residual pores are essentially not present. FIG. 1(*b*-2) is a transmission type polarization microscope photograph of a ceramic having a composition that is 0.02% rare earth-rich in comparison with the exact stoichiometric composition, and birefringence is observed. FIG. 1(*b*-3) is a transmission type polarization microscope photograph of a ceramic having the exact stoichiometric composition, and birefringence cannot be detected, but 3 ppm of pores having an average size of 1 μm are present in the depth direction. FIG. 1(*b*-4) is a transmission type polarization microscope photograph of a ceramic having the exact stoichiometric composition, and birefringence is essentially not present, but 200 ppm of pores having sizes of several microns to 10 μm are present. FIG. 1(*b*-5) is a transmission type polarization microscope photograph of a ceramic having the exact stoichiometric composition, and birefringence is substantially not present, but because the state of mixing was not good, inclusions having sizes of several microns to 10 μm [(TbY)$Al_2O_3$] are present.

Material evaluations are carried out by measuring the Verdet constant of materials using a measurement apparatus shown in FIG. 3, and the medium length required for the volume of the magnet being used is determined. As shown in the diagram, a magnet for evaluations, which has a magnetic flux density of 1 T, is arranged around the periphery of a material, and polarizers are arranged at both ends of the material. When irradiated with a Nd:YAG laser having a wavelength of 1.064 μm and a power of 10 mW, polarization of the laser light occurs within a Faraday element adjoining the 1 T magnet, and when the polarizer on the output side is rotated, the output of laser light relative to polarization angle can be measured.

Here, the Verdet constant can be determined from a theoretical equation, namely the Faraday equation: $\theta = VHL$ (here, $\theta$ denotes Faraday rotation angle, V denotes Verdet constant, H denotes magnetic flux density, and L denotes medium length).

FIG. 4 shows polarization characteristics when a $(Tb_{0.65}Y_{0.35})_3Al_5O_{12}$ ceramic having a length of 20 mm is placed in a 1 T magnetic field. (For reference, polarization characteristics of a TGG single crystal having almost the same Verdet constant are also shown. Laser light is shut down at positions of −45° and +1350 relative to the rotation angle of the polarizer on the output side. If the polarizer on the output side is rotated, transmission occurs sequentially, and maximum transmittance (minimum transmission loss) occurs when the polarizer on the input side and the polarizer on the output side are at positions of +45° each other. This value decreases as the loss in the material decreases, and this value is the insertion loss (dB). If the polarizer on the output side is further rotated, laser light is shut down, and the value returns to the initial value when $\theta = +135°$. In addition, because one rotation of the polarizer on the output side from −45° to +315° (−45°) (that is, from 0° to 360° (0°)) leads to two cycles comprising extinction (maximum insertion loss)

→transmission (minimum insertion loss)→extinction-transmission, the medium length (calculated from the Verdet constant) matches the magnetic field. The value for a state in which shut down occurs when the polarizers are parallel to each other is known as the extinction ratio, and this value indicates laser light shut down performance. As is clear from FIG. 4, it is understood that the ceramic (polycrystal) of the present invention, which has a similar Verdet constant to a TGG single crystal, has magneto-optical characteristics that are equal to or greater than those of a TGG single crystal.

The basic magneto-optical characteristics of the material are measured in a state where the power level of laser light is low. However, because the power of lasers that are actually used is high and heat generated in the inner part of a material in such a case causes a thermal lens effect or thermal birefringence, a Faraday element and isolator having stable characteristics even at high outputs are essentially required.

The composition of the ceramic of the present invention, additives, and the like, can be detected or measured using methods such as those described below.

(a) Additives

For additives added to the material, the content of Si, Mg and Ca in the material can be detected with units of ppm by using, for example, an ordinary equipment analyzing device ICP (Inductive Coupled Plasma)-MASS.

(b) Analysis of Composition of Ceramic Material

It is a prerequisite that the ceramic of the present invention is a single phase composed of a garnet phase in X-Ray fluorescence analysis (XRF), but the composition of Tb, Y, Lu and Al in the material can be identified using XRF. Compositional analysis can be carried out using an ordinary method in which a calibration curve is used.

(c) Stoichiometric Composition

In ordinary X-Ray diffraction analysis (XRD), it is assessed whether or not a material is a single phase, but assessing the exact stoichiometric composition in the present invention is not possible with conventional methods. Therefore, the structure of the material in the present invention can be assessed using observations from reflection microscopes and transmission type polarization microscopes.

It is a minimum requirement that a transparent ceramic is constituted from uniform particles, as shown in FIG. 1(a-1).

The image shown in FIG. 1(b-1) is a transmission+ polarization microscope photograph, but a uniform screen even under polarized light means that there is no birefringence (cubic crystals=no particles other than garnet), and a composition that has reached this state is known as an exact stoichiometric composition.

FIG. 1(b-2) shows a composition that is slightly inclined towards the rare earth side, and impurity phases cannot be detected, but because birefringence (color unevenness) is observed, light loss is high, and this composition therefore falls outside the scope of the present invention.

FIG. 1(a-2) shows a sample having a composition that is slightly alumina-rich, and abnormal grains can be seen in some locations. Birefringence can be seen at the periphery of abnormal grains in a ceramic having this type of microstructure, and because the amount of residual pores is high, this composition falls outside the scope of the present invention.

EXAMPLES

The features of the present invention will now be explained in greater detail through the use of Examples and Comparative examples. However, the scope of the present invention is not limited to the Examples.

Example 1

A commercially available $Tb_4O_7$ powder (purity >99.9%, average primary particle diameter 0.1 μm) and an $α-Al_2O_3$ powder (purity >99.9%, average primary particle diameter 0.3 μm) were used as starting raw materials. 300 ppm of colloidal silica, 100 ppm of CaO (average primary particle diameter 0.1 μm, $CaCO_3$ decomposition product) and 900 ppm of MgO (average primary particle diameter 0.05 μm) were added as additives to these powders, these powders were weighed out so as to obtain a mixed powder having a garnet composition, an organic binder (a 20% solution of a low molecular weight poly(vinyl alcohol) (PVA)) was added at a quantity of 3 wt % relative to the mixed powder, and the obtained mixture was placed in a synthetic resin container. 1 kg of high purity $Al_2O_3$ balls for grinding (particle diameter approximately 3 mm) and 250 mL of ethanol relative to a total of 100 g of the powder were placed in the container, and wet mixing was carried out for 15 hours to obtain a slurry.

The recovered slurry was dried by evaporating off ethanol at a temperature of 90° C., thereby obtaining a powder for molding. The powder for molding was sieved with a nylon sieve (100 mesh). Next, the powder that passed through the sieve was press molded at a pressure of approximately 10 MPa and then subjected to CIP molding at a pressure of 98 MPa.

The obtained molded body was then subjected to preliminary sintering in a vacuum of $1\times10^{-3}$ Pa at a heating rate of 150° C./hr to a maximum temperature of 1500° C. The relative density of the preliminary sintered body was measured using the Archimedes method, and found to be 98%.

The preliminary sintered body was then subjected to a HIP treatment. The treatment conditions were as follows. Treatment atmosphere: Ar gas, pressure: 196 MPa, temperature: 1550° C., treatment time: 3 hours. The HIP-treated sintered body was transparent but gray in color, and was therefore annealed for 10 hours in air at 1300° C. to remove lattice defects present inside the sintered body. A sintered body was produced in this way.

Examples 2 to 27

Sintered bodies were produced in the same way as in Example 1, except that compositions and synthesis conditions were as shown in Tables 1 to 6.

Examples 28 to 36

Sintered bodies were produced in the same way as in Example 1, except that compositions and synthesis conditions were as shown in Tables 7 to 8. Moreover, the average primary particle diameter of raw material powders shown in the tables was 100 to 300 nm, and TEOS (a Si source), $MgCO_3$ (a Mg source) and $CaCO_3$ (a Ca source) were used as additives.

Examples 37 to 45

Sintered bodies were produced in the same way as in Example 1, except that a material obtained by pulverizing a $Tb_2O_3$ powder obtained through hydrogen reduction to an average primary particle diameter of 1 μm was used as a starting raw material, and compositions and synthesis conditions were as demonstrated in Tables 9 to 10.

Examples 46 to 54

Sintered bodies were produced in the same way as in Example 1, except that the composition of $(Tb_xRe_{1-x})_3(Al_ySc_{1-y})_5O_{12}$ ceramics as shown in Tables 11 to 12, and synthesis conditions as shown in Tables 11 to 12 were employed. A $Sc_2O_3$ powder having an average primary particle diameter of 500 nm was used as a Sc source in each of these Examples. Moreover, because Sc fundamentally undergoes lattice substitution with Al at a 6-coordination site in the garnet structure, blending ratios of raw materials were calculated with this in mind.

Comparative Examples 1 to 9

The performance of a TGG single-crystal produced as Comparative Example 1 using a CZ method and the performance of a TAG single crystal produced as Comparative Example 2 using a FZ method are shown. In Comparative Examples 3 to 9, sintered bodies were produced in the same way as in Example 1, except that compositions as shown in Tables 13 to 14 and synthesis conditions as shown in Tables 13 to 14 were employed.

Comparative Examples 10 to 13

A $(Tb_{0.2}Lu_{0.8})_3Al_5O_{12}$ ceramic (a) and a $(Tb_{0.4}Y_{0.6})_3Al_5O_{12}$ ceramic (b) were produced at a pressure of 196 MPa through reactive sintering of $Tb_4O_7$, $Y_2O_3$, $Lu_2O_3$, $Al_2O_3$ and additives at 1600° C. using Ar gas as a pressure medium in the same way as in Example 1, except that synthesis conditions as shown in Table 15 were conducted.

Experimental Example 1

Sintered bodies and the like ultimately obtained in Examples and Comparative examples above were measured in terms of properties such as those shown below. These results are shown in Tables 1 to 15. In the tables, "1)" indicates measured values when a Nd:YAG laser having an output of 10 mW was used, and "2)" indicates the beam diameter enlargement (a thermal lens effect) and extinction ratio (birefringence) when a laser having an output of 200 W was used.

Moreover, units used in the tables are such that pore volume is "ppm by volume", average pore diameter is "μm", average crystal grain diameter is "μm", insertion loss is "dB" and extinction ratio is "dB".
(1) Relative Density of Preliminary Sintered Body The porosity in a sintered body obtained through preliminary sintering was measured using the Archimedes method (calculated from measurements of dry weight, hydrated weight and weight in water), and the relative density was calculated on the basis of these measurement results.
(2) Average Crystal Grain Diameter (Particle Size) of Sintered Body A surface obtained by polishing a sintered body to a mirror finish and then thermally etching at a temperature of 1500 to 1600° C. was measured using a reflection microscope. More specifically, the area per a single crystal grain was calculated from the value of (area of observed field of view)/(number of crystal grains in observed field of view) from 5 areas arbitrarily taken surface photographs (observed at a magnification rate of 200 to 1000 times), and the diameter for a case in which a crystal grain is assumed to be a sphere is taken to be the average crystal grain diameter of the sintered body. For example, FIG. 1(a-1) shows a ceramic of the present invention, which has an average particle diameter of 10 μm.
(3) Porosity Measurements were carried out using both a visible (transmission) microscope and a scanning electron microscope (SEM). In the case of the visible (transmission) microscope, pores present in the inner part of the material were observed at a magnification of 100 times or more, diameters of pores were observed, and the porosity was calculated on the basis of these diameters.

If the number of pores in the inner part of the material was not small enough to be countable, the insertion loss cannot be 0.2 dB or less. An ordinary sintered body has a relatively large number of pores, and can therefore be measured using the Archimedes method, but because the ceramic of the present invention is extremely compact, it is extremely difficult to find pores, and a special measurement method is employed, such as that described above. Even if voids are measured using an infrared (transmission) microscope and a visible (transmission) microscope, these are necessarily seen due to scattering, but if voids are a sub-micron size, pore diameter cannot be specified. Therefore, by additionally using a SEM, it is possible to specify the diameter of residual pores having sizes of 1 μm or less, and it is therefore possible to determine the average pore diameter. That is, in the present invention, the number of residual pores in the depth direction (inner part) of a material is determined using a transmission type polarization microscope, and then a method is performed in which these pore diameters are confirmed using a high resolution SEM. In addition, average pore diameter can be calculated from a formula (total value of pore diameters)/(total number of residual pores).

Moreover, an example of measuring residual pore amount using a transmission type microscope is described in "A. Ikesue, T. Kinoshita, K. Kamata, K. Yoshida, "Fabrication and Optical Properties of High-Performance Polycrystalline Nd:YAG Ceramics for Solid-State Lasers", J. Am. Ceram. Soc., 78 [4]1033 (1995)", and the present invention can be also carried out using the method described here.

In a method for calculating porosity, it was assumed that pores are spheres, and porosity (ppm by volume) was determined by dividing the total pore volume based on the volume of each pore (or the area of each pore) and the number thereof by the measured volume (or measured area).

As a reference, FIG. 1(b-1) shows a transmission type polarization microscope photograph of a ceramic of the present invention in which the porosity is less than 1 ppm (essentially zero). Not even a single void can be detected in the depth direction of the material. FIG. 1(b-2) shows a material containing 3 ppm of residual pores having an average pore diameter of 1 μm. FIG. 1(b-3) shows a ceramic containing 200 ppm of pores having diameters of several microns to several tens of microns, and the pore diameter and number of pores can be counted.
(4) Presence or Absence of the Second Phase
(4-1) Presence or Absence of Impurity Phase In ordinary transmission type microscope observations, 10 arbitrarily selected grain boundaries were observed, the presence or absence of birefringence (phases other than cubic phases) was investigated using a polarizer, and in a case where said region was present, said region was assessed as being an impurity phase. A ceramic shown in FIG. 1(b-4) has an exact stoichiometric composition, but because mixing is insufficient, inclusions of several microns to approximately 10 μm are detected. In observations using a transmission type polarization microscope, these inclusions exhibit significant birefringence, and this ceramic therefore falls outside the scope of the present invention.

(4-2) Presence or Absence of Grain Boundary Phase

The presence or absence of a grain boundary phase was confirmed through observations of the structure of a grain boundary portion (a lattice image) using a HR-TEM (at a magnification rate of several hundreds of thousands to 1 million times), further the presence or absence of a region that causes a difference in brightness (birefringence) was investigated, through observations using a transmission type polarization microscope (at a magnification rate of 100 times), and in a case where said region was present, said region was assessed as being a grain boundary phase (an impurity phase). A ceramic shown in FIG. 2(b) does not include a grain boundary phase, and a grain boundary is therefore a clean structure. FIG. 2(a) shows a ceramic in which an impurity phase of approximately 10 nm is present in a grain boundary area. When a grain boundary phase and the inner part of the particle are analyzed using TEM-EDS, there is absolutely no difference in terms of composition, and a grain boundary phase can be easily detected.

(5) Insertion Loss and Extinction Ratio

A method almost the same as that described in "$(Tb_zY_{1-x})_3Al_5O_{12}$ ceramics as Faraday rotator material", J. Am. Ceram. Soc., DOI: 10.1111/jace.14961 (2017) was used, but a Nd:YAG laser having an output of 10 mW and a wavelength of 1064 nm was used as a light source.

First, the Verdet constant is determined from a magnetic field and the Faraday rotation angle using a Nd—Fe—B-based magnet, and the material thickness able to achieve 45o of polarization was determined. Both surfaces of a material having a specified thickness were optically polished to a flatness of λ/10, subjected to an AR (anti-reflection) coating for the measurement wavelength band, and the general optical properties and performance as an isolator were evaluated, respectively according to a setup example for magneto-optical characteristic evaluations shown in FIG. 3. As shown in FIG. 3, a Nd:YAG laser having a wavelength of 1064 nm and an output of 10 mW was used, polarizers were provided on the laser incidence side and the isolator emission side (both polarizers were inclined at 45° each other), and polarizing characteristics were measured while a magnetic field of 1 T was applied. In this case, a TGG single crystal having a diameter of 5 mm and a length of 20 mm which was prepared using a CZ method was used as a reference.

FIG. 4 shows measured values for the TGG single crystal and the $(Tb_{0.65}Y_{0.35})_3Al_5O_{12}$ ceramic. Both materials were prepared so as to have a diameter of 5 mm and a length of 20 mm, and both surfaces having a diameter of 5 mm were optically polished. A magnetic field of 1 T was applied to the materials, and the Verdet constant was measured and found to be 36 $radT^{-1}m^{-1}$ in both cases. A Faraday element was placed in a 1 T magnetic field, a point at which the output side polarizer was set at −45° with respect to the incident side was taken to be the starting point, and while irradiating with a Nd:YAG laser having a fixed output, the transmitted amount of laser light (transmission loss) was measured while rotating the output side polarizer. The input and output polarizers are orthogonal to each other at the starting point, this point corresponds to the extinction ratio, and a point where the transmittance is at a maximum (the insertion loss is at a minimum) after rotating the output polarizer 90° from the starting point (45° in the diagram) corresponds to the insertion loss.

If the Verdet constant is measured and the medium length is adjusted, a TGG single crystal and a polycrystal ceramic generally exhibit similar behavior, but differences between materials are absolute values for insertion loss and extinction ratio.

(6) Transmitted Wave Front Strain

This measurement method comprises optically polishing a sample, applying an AR coating, and measuring with an interferometer.

TABLE 1

| | Example 1 | Example 2 | Example 3 | Example 4 | Example 5 |
|---|---|---|---|---|---|
| Chemical composition | $Tb_3Al_5O_{12}$ | $(Tb_{0.95}Lu_{0.05})_3Al_5O_{12}$ | $(Tb_{0.85}Lu_{0.15})_3Al_5O_{12}$ | $(Tb_{0.75}Lu_{0.25})_3Al_5O_{12}$ | $(Tb_{0.65}Lu_{0.35})_3Al_5O_{12}$ |
| Additives (ppm): | | | | | |
| Si ($SiO_2$) | 300 | As left | As left | As left | As left |
| Mg (MgO) | 900 | | | | |
| Ca (CaO) | 100 | | | | |
| Preliminary sintering temperature (° C.) | 1500 | 1520 | 1520 | 1550 | 1480 |
| Relative density (%) | 98 | 99 | 97 | 99 | 98 |
| HIP conditions: | | | | | |
| Temperature (° C.) | 1550 | 1600 | 1500 | 1550 | 1550 |
| Pressure (MPa) | 196 | 196 | 196 | 196 | 196 |
| Gas | Ar | Ar | Ar | $N_2$ | $N_2$ |
| Particle size (μm) | 10 | 10 | 8 | 5 | 4 |
| Porosity (ppm) | 10 | 3 | 1 | <1 | <1 |
| Presence/absence of second phase | No | No | No | No | No |
| Insertion loss[1] (dB) | 0.12 | 0.08 | 0.05 | 0.03 | 0.05 |
| Extinction ratio[1] (dB) | 32 | 37 | 35 | 40 | 42 |
| Transmitted wavefront distortion | λ/8 | λ/10 | λ/10 | λ/10 | λ/8 |
| Beam diameter enlargement[2] (%) | +2 | +1 | +1 | +2 | +2 |
| Extinction ratio[2] (dB) | 31 | 30 | 30 | 32 | 36 |

TABLE 2

|  | Example 6 | Example 7 | Example 8 | Example 9 |
|---|---|---|---|---|
| Chemical composition | $(Tb_{0.95}Lu_{0.05})_3Al_5O_{12}$ | $(Tb_{0.95}Y_{0.05})_3Al_5O_{12}$ | $(Tb_{0.70}Y_{0.30})_3Al_5O_{12}$ | $(Tb_{0.50}Y_{0.50})_3Al_5O_{12}$ |
| Additives (ppm): |  |  |  |  |
| Si ($SiO_2$) | 300 | As left | As left | As left |
| Mg (MgO) | 900 |  |  |  |
| Ca (CaO) | 100 |  |  |  |
| Preliminary sintering temperature (° C.) | 1460 | 1520 | 1500 | 1530 |
| Relative density (%) | 95 | 98 | 97 | 98 |
| HIP conditions: |  |  |  |  |
| Temperature (° C.) | 1620 | 1600 | 1600 | 1680 |
| Pressure (MPa) | 147 | 147 | 98 | 49 |
| Gas | Ar | Ar | Ar | Ar |
| Particle size (μm) | 3 | 12 | 15 | 20 |
| Porosity (ppm) | <1 | <1 | <1 | <1 |
| Presence/absence of second phase | No | No | No | No |
| Insertion loss[1] (dB) | 0.03 | 0.03 | 0.04 | 0.02 |
| Extinction ratio[1] (dB) | 32 | 35 | 40 | 42 |
| Transmitted wavefront distortion | λ/12 | λ/10 | λ/9 | λ/10 |
| Beam diameter enlargement[2] (%) | +1 | +3 | +2 | +1 |
| Extinction ratio[2] (dB) | 30 | 30 | 35 | 38 |

TABLE 3

|  | Example 10 | Example 11 | Example 12 | Example 13 | Example 14 |
|---|---|---|---|---|---|
| Chemical composition | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ |
| Additives (ppm) |  |  |  |  |  |
| Si ($SiO_2$) | 300 | 300 | 300 | 300 | 300 |
| Mg (MgO) | 300 | 450 | 600 | 1500 | 600 |
| Ca (CaO) |  |  |  |  |  |
| Preliminary sintering temperature (° C.) | 1520 | 1520 | 1520 | 1520 | 1520 |
| Relative density (%) | 98 | 99 | 97 | 98 | 98 |
| HIP conditions: |  |  |  |  |  |
| Temperature (° C.) | 1600 | 1600 | 1600 | 1600 | 1600 |
| Pressure (MPa) | 196 | 196 | 196 | 196 | 196 |
| Gas | Ar | Ar | Ar | Ar | Ar |
| Particle size (μm) | 15 | 10 | 10 | 20 | 15 |
| Porosity (ppm) | <1 | <1 | <1 | <1 | <1 |
| Presence/absence of second phase | No | No | No | No | No |
| Insertion loss[1] (dB) | 0.05 | 0.05 | 0.04 | 0.05 | 0.03 |
| Extinction ratio[1] (dB) | 36 | 37 | 36 | 42 | 40 |
| Beam diameter enlargement[2] (%) | +4 | +3 | +2 | +1 | +3 |
| Extinction ratio[2] (dB) | 32 | 33 | 30 | 37 | 34 |

TABLE 4

|  | Example 15 | Example 16 | Example 17 | Example 18 |
|---|---|---|---|---|
| Chemical composition | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ |
| Additives (ppm) |  |  |  |  |
| Si ($SiO_2$) | 300 | 300 | 150 | 500 |
| Mg (MgO) | 950 | 1000 | 500 | 1000 |
| Ca (CaO) |  | 300 | 200 | 400 |
| Preliminary sintering temperature (° C.) | 1520 | 1520 | 1520 | 1520 |
| Relative density (%) | 96 | 98 | 97 | 98 |
| HIP conditions: |  |  |  |  |
| Temperature (° C.) | 1600 | 1600 | 1600 | 1600 |
| Pressure (MPa) | 196 | 196 | 196 | 196 |
| Gas | Ar | Ar | Ar | Ar |
| Particle size (μm) | 15 | 10 | 20 | 30 |
| Porosity (ppm) | <1 | <1 | <1 | <1 |

TABLE 4-continued

|  | Example 15 | Example 16 | Example 17 | Example 18 |
|---|---|---|---|---|
| Presence/absence of second phase | No | No | No | No |
| Insertion loss[1] (dB) | 0.04 | 0.03 | 0.02 | 0.03 |
| Extinction ratio[1] (dB) | 37 | 42 | 38 | 41 |
| Beam diameter enlargement[2] (%) | +2 | +2 | +3 | +2 |
| Extinction ratio[2] (dB) | 32 | 37 | 33 | 36 |

TABLE 5

|  | Example 19 | Example 20 | Example 21 | Example 22 | Example 23 |
|---|---|---|---|---|---|
| Chemical composition | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ |
| Additives (ppm) |  |  |  |  |  |
| Si (SiO$_2$) | 300 | As left | As left | 50 | 200 |
| Mg (MgO) | 900 |  |  | 100 | 300 |
| Preliminary sintering temperature (° C.) | 1450 | 1500 | 1550 | 1600 | 1530 |
| Relative density (%) | 95 | 97 | 98 | 99 | 98 |
| HIP conditions: |  |  |  |  |  |
| Temperature (° C.) | 1600 | 1600 | 1600 | 1600 | 1500 |
| Pressure (MPa) | 196 | 196 | 196 | 196 | 196 |
| Gas | Ar | Ar | Ar | Ar | N$_2$ |
| Particle size (μm) | 10 | 10 | 10 | 12 | 10 |
| Porosity (ppm) | 8 | <1 | <1 | 5 | <1 |
| Presence/absence of second phase | No | No | No | No | No |
| Insertion loss[1] (dB) | 018 | 0.05 | 0.05 | 0.20 | 0.05 |
| Extinction ratio[1] (dB) | 32 | 38 | 40 | 30 | 40 |
| Beam diameter enlargement[2] (%) | +2 | +3 | +3 | +2 | +2 |
| Extinction ratio[2] (dB) | 30 | 34 | 35 | 30 | 36 |

TABLE 6

|  | Example 24 | Example 25 | Example 26 | Example 27 |
|---|---|---|---|---|
| Chemical composition | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ |
| Additives (ppm) |  |  |  |  |
| Si (SiO$_2$) | 200 | 450 | 350 | 250 |
| Mg (MgO) | 1000 | 300 | 200 | 100 |
| Preliminary sintering temperature (° C.) | 1530 | 1530 | 1530 | 1530 |
| Relative density (%) | 98 | 98 | 98 | 98 |
| HIP conditions: |  |  |  |  |
| Temperature (° C.) | 1570 | 1680 | 1680 | 1600 |
| Pressure (MPa) | 147 | 147 | 49 | 49 |
| Gas | Ar | Ar | Ar | N$_2$ |
| Particle size (μm) | 12 | 20 | 20 | 15 |
| Porosity (ppm) | <1 | <1 | 5 | <1 |
| Presence/absence of second phase | No | No | No | No |
| Insertion loss[1] (dB) | 0.03 | 0.03 | 0.04 | 0.02 |
| Extinction ratio[1] (dB) | 36 | 36 | 38 | 38 |
| Beam diameter enlargement[2] (%) | +2 | +2 | +2 | +3 |
| Extinction ratio[2] (dB) | 32 | 32 | 31 | 34 |

TABLE 7

|  | Example 28 | Example 29 | Example 30 | Example 31 | Example 32 |
|---|---|---|---|---|---|
| Chemical composition | $Tb_3Al_5O_{12}$ | $(Tb_{0.95}Lu_{0.05})_3Al_5O_{12}$ | $(Tb_{0.85}Lu_{0.15})_3Al_5O_{12}$ | $(Tb_{0.75}Lu_{0.25})_3Al_5O_{12}$ | $(Tb_{0.65}Lu_{0.35})_3Al_5O_{12}$ |
| Additives (ppm): |  |  |  |  |  |
| Si (SiO$_2$) | 300 | As left | As left | As left | As left |
| Mg (MgO) | 900 |  |  |  |  |
| Ca (CaO) | 100 |  |  |  |  |

TABLE 7-continued

|  | Example 28 | Example 29 | Example 30 | Example 31 | Example 32 |
|---|---|---|---|---|---|
| Preliminary sintering temperature (° C.) | 1500 | 1520 | 1520 | 1550 | 1480 |
| Relative density (%) | 98 | 99 | 97 | 99 | 98 |
| HIP conditions: |  |  |  |  |  |
| Temperature (° C.) | 1550 | 1600 | 1500 | 1550 | 1550 |
| Pressure (MPa) | 196 | 196 | 196 | 196 | 196 |
| Gas | Ar | Ar | Ar | $N_2$ | $N_2$ |
| Particle size (μm) | 12 | 8 | 5 | 5 | 5 |
| Porosity (ppm) | <1 | <1 | <1 | <1 | <1 |
| Presence/absence of second phase | No | No | No | No | No |
| Insertion loss[1] (dB) | 0.06 | 0.08 | 0.04 | 0.04 | 0.04 |
| Extinction ratio[1] (dB) | 32 | 37 | 35 | 40 | 42 |
| Transmitted wavefront distortion | $\lambda/12$ | $\lambda/12$ | $\lambda/20$ | $\lambda/12$ | $\lambda/15$ |
| Beam diameter enlargement[2] (%) | +2 | +4 | +2 | +2 | +2 |
| Extinction ratio[2] (dB) | 30 | 32 | 32 | 35 | 35 |

TABLE 8

|  | Example 33 | Example 34 | Example 35 | Example 36 |
|---|---|---|---|---|
| Chemical composition | $(Tb_{0.50}Lu_{0.50})_3Al_5O_{12}$ | $(Tb_{0.95}Y_{0.05})_3Al_5O_{12}$ | $(Tb_{0.70}Y_{0.30})_3Al_5O_{12}$ | $(Tb_{0.50}Y_{0.50})_3Al_5O_{12}$ |
| Additives (ppm): |  |  |  |  |
| Si ($SiO_2$) | 300 | As left | As left | As left |
| Mg (MgO) | 900 |  |  |  |
| Ca (CaO) | 100 |  |  |  |
| Preliminary sintering temperature (° C.) | 1460 | 1520 | 1500 | 1530 |
| Relative density (%) | 95 | 98 | 97 | 98 |
| HIP conditions: |  |  |  |  |
| Temperature (° C.) | 1620 | 1600 | 1600 | 1680 |
| Pressure (MPa) | 147 | 147 | 98 | 49 |
| Gas | Ar | Ar | Ar | Ar |
| Particle size (μm) | 5 | 20 | 20 | 25 |
| Porosity (ppm) | <1 | <1 | <1 | <1 |
| Presence/absence of second phase | No | No | No | No |
| Insertion loss[1] (dB) | 0.03 | 0.05 | 0.04 | 0.04 |
| Extinction ratio[1] (dB) | 32 | 35 | 42 | 41 |
| Transmitted wavefront distortion | $\lambda/12$ | $\lambda/12$ | $\lambda/14$ | $\lambda/19$ |
| Beam diameter enlargement[2] (%) | +2 | +3 | +2 | +3 |
| Extinction ratio[2] (dB) | 30 | 31 | 35 | 33 |

TABLE 9

|  | Example 37 | Example 38 | Example 39 | Example 40 | Example 41 |
|---|---|---|---|---|---|
| Chemical composition | $Tb_3Al_5O_{12}$ | $(Tb_{0.95}Lu_{0.05})_3Al_5O_{12}$ | $(Tb_{0.50}Lu_{0.50})_3Al_5O_{12}$ | $(Tb_{0.50}Y_{0.50})_3Al_5O_{12}$ | $(Tb_{0.70}Y_{0.30})_3Al_5O_{12}$ |
| Additives (ppm): |  |  |  |  |  |
| Si ($SiO_2$) | 300 | As left | As left | As left | 100 |
| Mg (MgO) | 900 |  |  |  | 100 |
| Ca (CaO) | 100 |  |  |  |  |
| Preliminary sintering temperature (° C.) | 1500 | 1520 | 1460 | 1530 | 1600 |
| Relative density (%) | 98 | 96 | 97 | 99 | 99 |
| HIP conditions: |  |  |  |  |  |
| Temperature (° C.) | 1550 | 1500 | 1620 | 1680 | 1600 |
| Pressure (MPa) | 196 | 196 | 147 | 49 | 196 |
| Gas | Ar | Ar | Ar | Ar | Ar |
| Particle size (μm) | 10 | 10 | 10 | 12 | 15 |
| Porosity (ppm) | <1 | <1 | <1 | <1 | 5 |
| Presence/absence of second phase | No | No | No | No | No |

TABLE 9-continued

|  | Example 37 | Example 38 | Example 39 | Example 40 | Example 41 |
|---|---|---|---|---|---|
| Insertion loss[1] (dB) | 0.05 | 0.04 | 0.04 | 0.06 | 0.07 |
| Extinction ratio[1] (dB) | 35 | 37 | 36 | 39 | 35 |
| Transmitted wavefront distortion | $\lambda/10$ | $\lambda/15$ | $\lambda/10$ | $\lambda/12$ | $\lambda/12$ |
| Beam diameter enlargement[2] (%) | +4 | +3 | +3 | +3 | +2 |
| Extinction ratio[2] (dB) | 30 | 31 | 30 | 32 | 31 |

TABLE 10

|  | Example 42 | Example 43 | Example 44 | Example 45 |
|---|---|---|---|---|
| Chemical composition | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ |
| Additives (ppm): | | | | |
| Si ($SiO_2$) | 200 | 300 | 300 | 500 |
| Mg (MgO) | 1000 | 600 | 1000 | 1000 |
| Ca (CaO) | | | 300 | 400 |
| Preliminary sintering temperature (° C.) | 1530 | 1520 | 1520 | 1520 |
| Relative density (%) | 98 | 98 | 98 | 99 |
| HIP conditions: | | | | |
| Temperature (° C.) | 1570 | 1600 | 1600 | 1600 |
| Pressure (MPa) | 147 | 196 | 196 | 196 |
| Gas | Ar | Ar | Ar | Ar |
| Particle size (μm) | 10 | 13 | 18 | 30 |
| Porosity (ppm) | <1 | <1 | <1 | <1 |
| Presence/absence of second phase | No | No | No | No |
| Insertion loss[1] (dB) | 0.05 | 0.04 | 0.04 | 0.07 |
| Extinction ratio[1] (dB) | 34 | 39 | 40 | 38 |
| Transmitted wavefront distortion | $\lambda/12$ | $\lambda/10$ | $\lambda/12$ | $\lambda/14$ |
| Beam diameter enlargement[2] (%) | +3 | +3 | +3 | +4 |
| Extinction ratio[2] (dB) | 30 | 33 | 33 | 30 |

TABLE 11

|  | Example 46 | Example 47 | Example 48 | Example 49 | Example 50 |
|---|---|---|---|---|---|
| Chemical composition | $(Tb_{0.85}Y_{0.15})_3(Al_{0.98}Sc_{0.02})_5O_{12}$ | $(Tb_{0.85}Y_{0.15})_3(Al_{0.90}Sc_{0.10})_5O_{12}$ | $(Tb_{0.85}Y_{0.15})_3(Al_{0.80}Sc_{0.20})_5O_{12}$ | $(Tb_{0.85}Lu_{0.15})_3(Al_{0.90}Sc_{0.10})_5O_{12}$ | $(Tb_{0.55}Y_{0.45})_3(Al_{0.85}Sc_{0.15})_5O_{12}$ |
| Additives (ppm): | | | | | |
| Si ($SiO_2$) | 300 | As left | As left | As left | 450 |
| Mg (MgO) | 800 | | | | 450 |
| Ca (CaO) | 100 | | | | 450 |
| Preliminary sintering temperature (° C.) | 1550 | 1550 | 1560 | 1540 | 1600 |
| Relative density (%) | 97 | 96 | 97 | 97 | 99 |
| HIP conditions: | | | | | |
| Temperature (° C.) | 1580 | 1580 | 1580 | 1580 | 1600 |
| Pressure (MPa) | 176 | 176 | 176 | 176 | 196 |
| Gas | Ar | Ar | Ar | Ar | Ar |
| Particle size (μm) | 13 | 12 | 8 | 12 | 15 |
| Porosity (ppm) | <1 | <1 | <1 | <1 | 5 |
| Presence/absence of second phase | No | No | No | No | No |
| Insertion loss[1] (dB) | 0.08 | 0.06 | 0.06 | 0.04 | 0.04 |
| Extinction ratio[1] (dB) | 38 | 38 | 42 | 41 | 39 |
| Transmitted wavefront distortion | $\lambda/12$ | $\lambda/10$ | $\lambda/10$ | $\lambda/8$ | $\lambda/10$ |
| Beam diameter enlargement[2] (%) | +2 | +4 | +3 | +3 | +3 |
| Extinction ratio[2] (dB) | 32 | 34 | 36 | 35 | 32 |

TABLE 12

|  | Example 51 | Example 52 | Example 53 | Example 54 |
|---|---|---|---|---|
| Chemical composition | $Tb_3(Al_{0.90}Sc_{0.2})_5O_{12}$ | $Tb_3(Al_{0.60}Sc_{0.4})_5O_{12}$ | $(Tb_{0.90}Y_{0.10})_3(Al_{0.70}Sc_{0.30})_5O_{12}$ | $(Tb_{0.85}Lu_{0.15})_3(Al_{0.90}Sc_{0.10})_5O_{12}$ |
| Additives (ppm): |  |  |  |  |
| Si ($SiO_2$) | 200 | 300 | 300 | 200 |
| Mg (MgO) |  |  |  |  |
| Ca (CaO) | 800 | 600 | 1000 | 1000 |
| Preliminary sintering temperature (° C.) | 1590 | 1580 | 1520 | 1520 |
| Relative density (%) | 98 | 98 | 98 | 99 |
| HIP conditions: |  |  |  |  |
| Temperature (° C.) | 1570 | 1600 | 1600 | 1680 |
| Pressure (MPa) | 147 | 196 | 196 | 98 |
| Gas | Ar | Ar | Ar | Ar |
| Particle size (μm) | 10 | 15 | 16 | 24 |
| Porosity (ppm) | <1 | <1 | <1 | <1 |
| Presence/absence of second phase | No | No | No | No |
| Insertion loss[1] (dB) | 0.05 | 0.06 | 0.02 | 0.06 |
| Extinction ratio[1] (dB) | 38 | 36 | 39 | 41 |
| Transmitted wavefront distortion | $\lambda/10$ | $\lambda/11$ | $\lambda/9$ | $\lambda/10$ |
| Beam diameter enlargement[2] (%) | +2 | +2 | +3 | +3 |
| Extinction ratio[2] (dB) | 31 | 32 | 34 | 36 |

TABLE 13

|  | Comparative Example 1 | Comparative Example 2 | Comparative Example 3 | Comparative Example 4 | Comparative Example 5 |
|---|---|---|---|---|---|
| Chemical composition | TGG single crystal (CZ) | TAG single crystal (FZ) | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ 0.05% $Al_2O_3$ excess |
| Additives (ppm): |  |  |  |  |  |
| Si ($SiO_2$) |  |  | 100 | 450 | 600 |
| Mg (MgO) |  |  |  |  | 100 |
| Ca (CaO) |  |  |  |  |  |
| Preliminary sintering temperature (° C.) |  |  | 1460 | 1530 | 1550 |
| Relative density (%) |  |  | 97 | 99 | 99 |
| HIP conditions: |  |  |  |  |  |
| Temperature (° C.) |  |  | 1580 | 1580 | 1580 |
| Pressure (MPa) |  |  | 196 | 196 | 196 |
| Gas |  |  | Ar | Ar | Ar |
| Particle size (μm) |  |  | 35 | 50 | 40 |
| Porosity (ppm) |  |  | 15 | 15 | 20 |
| Presence/absence of second phase | No | Yes | No | No | Yes $Al_2O_3$ |
| Insertion loss[1] (dB) | 0.08 | 0.15 | 0.28 | 0.10 | 1.50 |
| Extinction ratio[1] (dB) | 28 | 25 | 25 | 30 | 25 |
| Transmitted wavefront distortion | $\lambda/10$ | $\lambda/2$ | $\lambda/8$ | $\lambda/8$ | $\lambda/10$ |
| Beam diameter enlargement[2] (%) | +39 | +18 | +12 | +25 | +18 |
| Extinction ratio[2] (dB) | 10 | 15 | 20 | 18 | 15 |

TABLE 14

|  | Comparative Example 6 | Comparative Example 7 | Comparative Example 8 | Comparative Example 9 |
|---|---|---|---|---|
| Chemical composition | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ | $(Tb_{0.70}Y_{0.30})_3Al_5O_{12}$ |
| Additives (ppm): |  |  |  |  |
| Si ($SiO_2$) | 40 | 3 (impurity in raw material) | 600 | 900 |
| Mg (MgO) |  |  | 50 | 150 |
| Ca (CaO) |  |  | 50 |  |

TABLE 14-continued

|  | Comparative Example 6 | Comparative Example 7 | Comparative Example 8 | Comparative Example 9 |
|---|---|---|---|---|
| Preliminary sintering temperature (° C.) | 1600 | 1600 | 1440 | 1700 |
| Relative density (%) | 98 | 95 | 92 | 98 |
| HIP conditions: | | | | |
| Temperature (° C.) | 1580 | 1600 | 1600 (devitrification) | 1720 |
| Pressure (MPa) | 147 | 196 | 147 | 147 |
| Gas | Ar | Ar | Ar | Ar |
| Particle size (μm) | 4 | 1 | 10 | 55 |
| Porosity (ppm) | 20 | 150 | 30,000 | 200 |
| Presence/absence of second phase | Yes (TbY)AlO$_3$ | Yes (TbY)AlO$_3$ | No | No |
| Insertion loss[1] (dB) | 2.40 | Not measurable | Not measurable | 3.50 |
| Extinction ratio[1] (dB) | 20 | Not measurable | Not measurable | 25 |
| Transmitted wavefront distortion | Not measurable | Not measurable | Not measurable | λ/3 |
| Beam diameter enlargement[2] (%) | Not measurable | Not measurable | Not measurable | +12 |
| Extinction ratio[2] (dB) | Not measurable | Not measurable | Not measurable | 12 |

TABLE 15

|  | Comparative Example 10 | Comparative Example 11 | Comparative Example 12 | Comparative Example 13 |
|---|---|---|---|---|
| Chemical composition | (Tb$_{0.20}$Y$_{0.80}$)$_3$Al$_5$O$_{12}$ | (Tb$_{0.37}$Y$_{0.63}$)$_3$Al$_5$O$_{12}$ | (Tb$_{0.70}$Y$_{0.30}$)$_3$Al$_5$O$_{12}$ | (Tb$_{0.70}$Y$_{0.30}$)$_3$Al$_5$O$_{12}$ |
| Additives (ppm): | | | | |
| Si (SiO$_2$) | 200 | 250 | 300 | 300 |
| Mg (MgO) | 350 | 600 | 450 | 600 |
| Ca (CaO) | 50 | | | |
| Preliminary sintering temperature (° C.) | 1580 | 1550 | 1520 | 1520 |
| Relative density (%) | 92 | 98 | 99 | 97 |
| HIP conditions: | | | | |
| Temperature (° C.) | 1600 | 1600 | 1600 | 1600 |
| Pressure (MPa) | 147 | 147 | 196 | 196 |
| Gas | Ar | Ar | Ar | Ar |
| Particle size (μm) | 10 | 12 | 10 | 10 |
| Porosity (ppm) | <1 | <1 | <1 | <1 |
| Presence/absence of second phase | No | No | No | No |
| Insertion loss[1] (dB) | 0.05 | 0.04 | 0.05 | 0.04 |
| Extinction ratio[1] (dB) | 39 | 38 | 37 | 36 |
| Transmitted wavefront distortion | λ/8 | λ/10 | λ/8 | λ/8 |
| Beam diameter enlargement[2] (%) | +2 | +2 | +13 | +14 |
| Extinction ratio[2] (dB) | 30 | 29 | 12 | 11 |

As is clear from these results, the ceramic of the present invention, which contains prescribed additives, is constituted from ultrafine crystal grains and is constituted from a single crystal phase (a garnet type polycrystal) having almost no residual pores, and therefore has a low insertion loss and a high extinction ratio, and because the degree of enlargement of beam diameter is restricted to +4%, generation of heat can be effectively inhibited.

However, the TGG single crystal in Comparative Example 1 was relatively good in terms of insertion loss and extinction ratio, but showed a high degree of beam diameter enlargement and showed poor high power characteristics. In addition, the basic characteristics of the TAG single crystal in Comparative Example 2 were inferior to those of TGG, and high power characteristics were also low.

Comparative Examples 3 to 9 showed some good characteristics, but the degree of enlargement of beam diameter was either high or could not be measured (measurements were not possible because transmittance or optical characteristics were too low). In particular, Comparative Examples 3 to 4, which contained only Si as an additive, had a degree of beam diameter enlargement of +12% to +25%, and showed reduced characteristics in high power ranges.

Comparative Examples 10 to 11 had compositions in which the content of Tb was low, and the insertion loss and extinction ratio at a wavelength of 1.064 μm were 0.05 dB and 0.04 dB for the former, and 39 dB and 38 dB for the latter, which were superior to those of a TGG single crystal. In addition, when irradiated with a laser having a power of 200 W, the decrease in extinction ratio and the increase in beam diameter were greater than those shown in Examples. However, the Verdet constants of these ceramics were 11 radT$^{-1}$m$^{-1}$ (for Comparative Example 10) and 23 radT$^{-1}$m$^{-1}$ (for Comparative Example 11). The lengths of a 1 T magnetic field, as calculated from the Verdet constants, were 65 mm and 32 mm, meaning that the devices are extremely large. Therefore, element performance per se was good, but these comparative examples fall outside the scope of the present invention in terms of device volume.

Comparative Examples 12 to 13 were synthesized using $Tb_4O_7$ and $Y_2O_3$ having a purity of 99.9% and alumina (in which Na and Fe are the main impurities) having a purity of 99.5% as raw materials, and were not inferior to Examples in terms of magneto-optical characteristics and optical uniformity. However, when irradiated with a laser having a power of 200 W, it was found that heat was generated and results for thermal lens effect and birefringence were poor.

Among Examples, it should be added that, for example, samples in Examples in which $Tb_4O_7$ was used as a starting raw material (Examples 1 to 9) had a transmitted wavefront distortion of $\lambda/8$ to $\lambda/12$, whereas samples in Examples in which $Tb_2O_3$ was used as a starting raw material (Example 37 to 45) had a transmitted wavefront distortion of $\lambda/10$ to $\lambda/15$, and it was therefore understood that using $Tb_2O_3$ as a starting raw material more reliably achieved high uniformity. Improved transmitted wavefront distortion means that the quality of a beam passing through a Faraday element is improved, and laser functionality can be maximized by maintaining beam quality.

INDUSTRIAL APPLICABILITY

The present invention relates to a Tb-containing aluminum garnet transparent ceramic that exhibits transparency and magneto-optical characteristics, can be used in a Faraday rotor in the visible to infrared wavelength range, and can exhibit excellent performance as an optical isolator for high-power applications in particular.

The invention claimed is:

1. A Tb-containing rare earth-aluminum garnet ceramic comprising
   (i) a garnet polycrystal represented by the compositional formula $(Tb_xRe_{1-x})_3(Al_ySC_{1-y})_5O_{12}$ wherein Re is at least at least one element selected from a group consisting of Y and Lu, x=1.0–0.5, and y=1.0–0.6;
   (ii) Si;
   (iii) a combination of Ca and Mg; and
   wherein the weight ratio of said Si, Ca and Mg by weight as the oxides is such that [(CaO+MgO)/SiO$_2$] is 1 or more.

2. The Tb-containing rare earth-aluminum garnet ceramic according to claim 1, wherein the content of the Si is 50 to 500 ppm by weight of SiO$_2$, and a total the Ca and Mg is 100 to 2000 ppm by weight of CaO and MgO.

3. A Faraday element that contains the Tb-containing rare earth-aluminum garnet ceramic according to claim 2.

4. An optical isolator device that includes the Faraday element according to claim 3.

5. An optical isolator device that includes the Faraday element according to claim 1.

6. The Tb-containing rare earth-aluminum garnet ceramic according to claim 1, wherein the average crystal grain diameter falls within a range from 1 to 30 µm.

7. A Faraday element that contains the Tb-containing rare earth-aluminum garnet ceramic according to claim 6.

8. An optical isolator device that includes the Faraday element according to claim 7.

9. The Tb-containing rare earth-aluminum garnet ceramic according to claim 1, which has a relative density of 99.999% or more.

10. A Faraday element that contains the Tb-containing rare earth-aluminum garnet ceramic according to claim 9.

11. The Tb-containing rare earth-aluminum garnet ceramic according to claim 1, wherein crystal phases other than the garnet polycrystal and amorphous phases are not detected.

12. A Faraday element that contains the Tb-containing rare earth-aluminum garnet ceramic according to claim 11.

13. The Tb-containing rare earth-aluminum garnet ceramic according to claim 1, wherein at a thickness t by which light having a wavelength $\lambda$ of 1200 nm to 550 nm undergoes Faraday rotation of 45°, the insertion loss is 0.2 dB or less and an extinction ratio is 30 dB or more for the light.

14. A Faraday element that contains the Tb-containing rare earth-aluminum garnet ceramic according to claim 13.

15. A Faraday element that contains the Tb-containing rare earth-aluminum garnet ceramic according to claim 1.

16. An optical isolator device that includes the Faraday element according to claim 15.

17. A method for producing a Tb-containing rare earth-aluminum garnet ceramic, the method comprising:
   (1) a step for wet mixing
      (1-1) a mixed powder raw material which contains (a) a terbium oxide having an average primary particle diameter of 1 um or less, (b) an aluminum oxide having an average primary particle diameter 1 um or less, (c) a combination of a calcium compound having an average primary particle diameter of 1 um or less and a magnesium compound having an average primary particle diameter of 1 um or less as oxides, and (d) a silicon compound having an average primary particle diameter of 1 um or less, and which has a stoichiometric garnet composition, or (1-2) a mixed powder raw material which contains (a) an oxide which has an average primary particle diameter of 1 um or less and is represented by the formula $(TbxRe1-x)3(AlySc1-y)sO12$ wherein Re is at least one element selected from a group consisting of Y and Lu, x=1.0-0.5, and y=1.0-0.6, (b) a combination of a calcium compound having an average primary particle diameter of 1 um or less and a magnesium compound having an average primary particle diameter of 1 um or less as oxides, and (c) a silicon compound having an average primary particle diameter of 1 um or less, and which has a stoichiometric garnet composition, and
   wherein the weight ratio of said Si, Ca and Mg by weight as the oxides is such that [(CaO+MgO)/SiO$_2$] is 1 or more in an alcohol to obtain a mixture;
   (2) a step for press molding this mixture to obtain a green compact;
   (3) a step for subjecting the green compact to preliminary sintering at a temperature of 1450 to 1600° C. to obtain a preliminary sintered body having a relative density of 95 to 99%;
   (4) a step for subjecting the preliminary sintered body to a HIP treatment at a temperature of 1500 to 1680° C. and a pressure of 49 to 196 MPa; and
   (5) a step for annealing the HIP-treated sintered body at a temperature of 1200 to 1500° C.

18. The production method according to claim 17, wherein $Tb_2O_3$ is used as the terbium oxide.

* * * * *